(12) United States Patent
Smith et al.

(10) Patent No.: US 8,379,322 B2
(45) Date of Patent: Feb. 19, 2013

(54) INTEGRATED ASPHERE DESIGN FOR DISPLAY

(75) Inventors: Steven Edward Smith, Allen, TX (US); Patrick Rene Destain, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 751 days.

(21) Appl. No.: 12/165,902

(22) Filed: Jul. 1, 2008

(65) Prior Publication Data

US 2009/0009885 A1   Jan. 8, 2009

Related U.S. Application Data

(60) Provisional application No. 60/947,630, filed on Jul. 2, 2007.

(51) Int. Cl.
*G02B 3/02* (2006.01)
*G02B 17/00* (2006.01)

(52) U.S. Cl. .......................... 359/708; 359/726; 359/733

(58) Field of Classification Search .................. 359/708, 359/726, 732, 733, 741, 796
See application file for complete search history.

(56) References Cited

U.S. PATENT DOCUMENTS 7,848,016 B2 * 12/2010 Dodoc ........................ 359/365
7,918,559 B2 *  4/2011 Tesar ........................... 351/221

* cited by examiner

*Primary Examiner* — Jack Dinh
(74) *Attorney, Agent, or Firm* — Warren L. Franz; Wade J. Brady, III; Frederick J. Telecky, Jr.

(57) ABSTRACT

A projection display system and method is provided. One or more light sources, such as solid state lasers, generates light of various colors that is modulated by a spatial light modulator, such as a digital micro-mirror device. The projection optics of the system include a telecentric rear group of lenses followed by a pair of aspheric lenses formed of a continuous piece of material. A folding mirror, such as a single-piece or multi-piece angular mirror, is disposed along the optical path between the aspheric lenses, to reduce the depth of the enclosure, and an aspheric mirror projects the image onto a projection screen. A folding mirror may be used after the aspheric mirror to further reduce the depth of the enclosure.

8 Claims, 19 Drawing Sheets

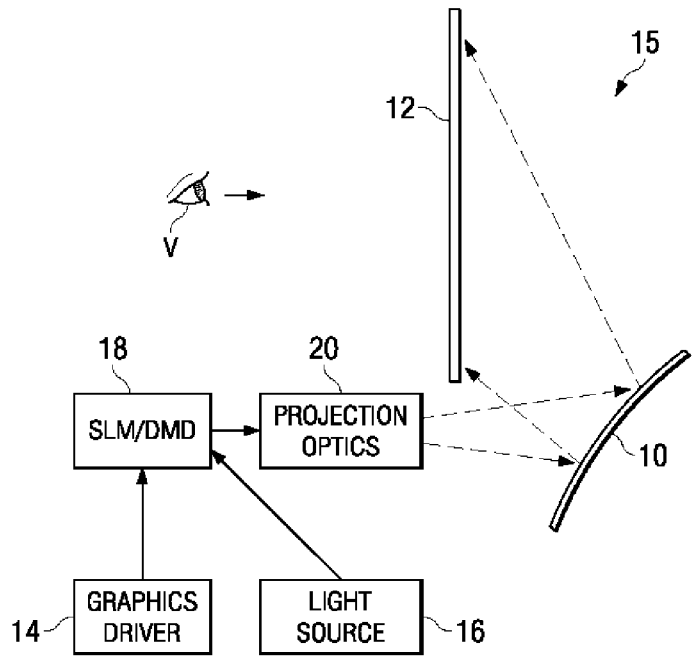
*FIG. 2*
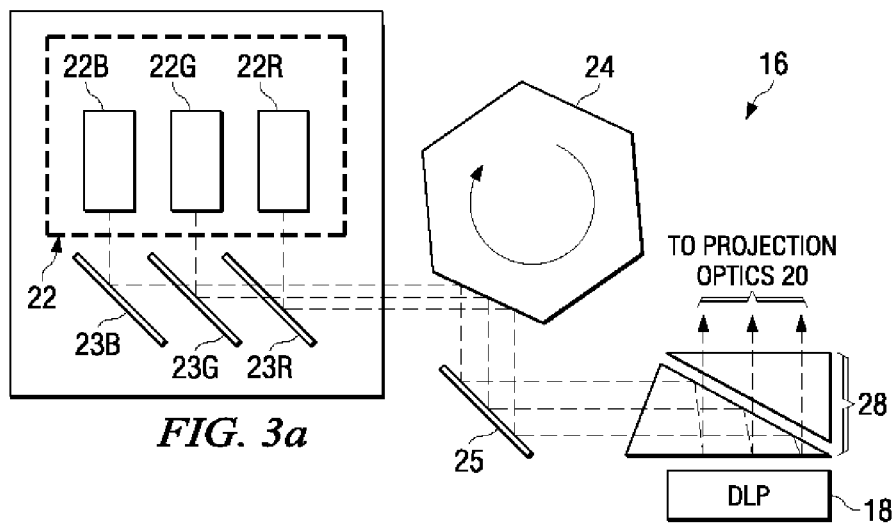
*FIG. 3a*
*FIG. 3b*

INTEGRATED ASPHERE DESIGN FOR DISPLAY

This application claims the benefit of U.S. Provisional Application No. 60/947,630 filed on Jul. 2, 2007, which application is hereby incorporated herein by reference.

CROSS-REFERENCE TO RELATED APPLICATIONS

This application is related to the following co-assigned patent applications: Ser. No. 11/959,277, filed Dec. 18, 2007, entitled "Optical System for a Thin, Low-Chin, Projection Television," Ser. No. 11/693,343, filed Mar. 29, 2007, entitled "Optical System for a Thin, Low-Chin, Projection Television," Ser. No. 11/848,022, filed Aug. 30, 2007, entitled "System and Method for Display Illumination," and Ser. No. 11/949,624, filed Dec. 3, 2007, entitled "System and Method for Dynamic Display System Illumination," which applications are hereby incorporated herein by reference.

STATEMENT REGARDING FEDERALLY SPONSORED RESEARCH OR DEVELOPMENT

Not applicable.

BACKGROUND

Embodiments are in the field of projection display systems, and are more specifically directed to the arrangement of optical elements in such a display system.

As is evident from a visit to a modern electronics store, the number of flat-panel (e.g., non-CRT) televisions has vastly increased in recent years, while the purchase price for such sets continues to fall. This tremendous competition is due in large part to the competing technologies for the display of high-definition television content. As known in the art, three major current display technologies for flat-panel televisions include liquid-crystal display (LCD), plasma display, and digital micromirror (DMD) based displays. The micromirror-based displays, and some LCD displays, are projection displays, in that a light source illuminates a spatial light modulator formed by the micromirror or LCD panel, with the modulated light then optically projected to a display screen. Plasma displays, on the other hand, are not projection displays; rather, each pixel at the display screen includes red, green, and blue phosphors that are individually excitable by way of argon, neon, and xenon gases, producing the image. Some LCD televisions involve "direct-view" displays, rather than projection displays, such that the liquid crystal elements are at the display screen and are directly energized to produce the image.

In modern micromirror-based projection displays, such as DLP® projection displays now popular in the marketplace using technology developed by Texas Instruments Incorporated, a digital micromirror device spatially modulates light from a light source according to the content to be displayed. An optical "engine," which includes lens and mirror elements, projects the modulated light onto the display screen. As known in the industry, micromirror-based projection displays are advantageous from the standpoint of brightness, clarity, and color reproduction, as compared with other flat-panel televisions and displays. In addition, the use of micromirror spatial light modulators enable higher-speed modulation of light than many LCD systems, and micromirror-based systems have been observed to be extremely reliable over time.

However, conventional micromirror-based projection systems typically require larger "form factor" enclosures, than do LCD and plasma flat-panel systems of similar screen size and resolution. Two important measures of the enclosure for flat-panel display systems are referred to in the art as the "chin" dimension and the "depth" of the case. FIG. 1a illustrates the conventional definition of the "chin" of a flat-panel television, while FIG. 1b illustrates the "depth" of the system.

As shown in the front elevation view of FIG. 1a, display screen 2 is housed within enclosure 4. The portion of enclosure 4 that extends below screen 2 constitutes the "chin" of the display system. FIG. 1a illustrates dimension CHIN as the distance from the bottom edge of screen 2 to the bottom of enclosure 4. FIG. 1b illustrates, in connection with a side view of enclosure 4, the dimension DEPTH as the measurement between the front of enclosure 4 and the back of a rear-ward extending portion of enclosure 4. In micromirror-based projection display systems, the system components of the light source, digital micromirror, and the system projection optics, reside within the "chin" and the rearward extending portions of enclosure 4.

Consumers are attracted to televisions and display systems that are thin, from front to back, and for which the enclosure only minimally extends beyond the dimensions of the display screen itself. Indeed, it has been observed that the consumer buying decision is often based on the size of the enclosure for a given screen size. As mentioned above, the enclosures of modern plasma and direct-view LCD display systems can typically involve minimal chin and depth, because they are not rear projection systems and as such do not require enclosure of the light source, modulator, and projection optics required by projection systems, especially conventional micromirror-based systems. As such, these conventional micromirror-based projection systems are at a competitive disadvantage in the marketplace in this regard. And therefore, it is desirable for micromirror-based projection systems to also minimize the chin and depth of their enclosures, to attain and preserve market share.

In addition to the physical volume required for enclosures of projection display systems such as those based on micromirrors, other constraints also have resulted in substantial chin and depth dimensions. One such constraint is due to the TIR (Total Internal Reflection) Fresnel display screens that are now commonly used in projection display systems. As known in the art, TIR Fresnel display screens are capable of receiving light at a relatively steep angle from the normal, and of directing that light into the direction normal to the display screen, analogous to Fresnel lenses as used in traffic lights and lighthouses. This construction permits the source of the projected light to reside off-axis with the display screen, which greatly reduces the depth of projection display systems. FIG. 1c shows the rear projection of an image from source 8 (which may be a plane mirror, for example) to display screen 2, which is constructed as a conventional TIR Fresnel display screen. The angle of incidence of light from source 8 to the bottom of screen 2 is at a minimum angle $\phi_m$ from the normal, while the angle of light from source 8 to the top of screen 2 is at a maximum angle of incidence $\phi_x$. It has been observed that, for conventional TIR Fresnel display screens, the minimum angle of incidence $\phi_m$ should be above 50° from the normal, to avoid flare and reduced contrast in portions of the displayed image. However, in order to achieve such a large minimum angle of incidence, it is therefore often necessary to construct an enclosure having substantial "chin", as evident from FIG. 1c. In addition, if a plane mirror is used as source 8, to reflect the projected image to display screen 2, as shown in the conventional system of FIG. 1c, the minimum angle constraint commonly requires the height of this mirror to on the order of one-half the vertical dimension of display screen 2, especially as the depth of enclosure 4 is minimized.

Other design and manufacturing constraints also affect the design of conventional display "engines" for micromirror-based projection displays. These other constraints involve the nature of the light source (e.g., the "etendue" of the light), the extent of lens groups and numbers of lenses required to obtain a high resolution and minimum distortion image at the display.

By way of further background, a current trend in the construction of projection display systems is the use of non-telecentric lenses in the projection optics, between the spatial light modulator and the display screen. As known in the art, "non-telecentric" refers to lens arrangements that receive light from an image or source (e.g., the modulator) that is larger than the lenses; as such, the chief rays of light from various locations of the image are not parallel to, or not collimated with, one another. The use of non-telecentric lenses is popular in projection systems because the diameter of the lenses can be much smaller than the image or light source. Not only is the physical size of the lenses reduced, but the f-number of the lenses required for efficient light transfer is also kept relatively high, further reducing the cost of the lenses. As known in the art, large lenses of low f-numbers are relatively expensive to produce, especially for applications in which high image quality and resolution is important, as in high-definition television. It has also been observed that higher image contrast is generally attained by non-telecentric projection lenses. In addition, display systems using micromirror based spatial light modulators in combination with non-telecentric lenses can omit the "total internal reflection" (TIR) prism for separating "on" and "off" pixel light that is otherwise generally necessary with telecentric projection lens systems. Non-telecentric projection lenses are thus popular in modern projection display systems.

By way of further background, however, non-telecentric projection lenses are known to present certain limitations in projection display systems. Defocus caused by thermal or alignment effects at the SLM plane is made evident as dramatic magnification changes in the displayed image ("overfill" or "underfill") in systems using non-telecentric projection lenses, even if the f-number of the projection lens group is relatively high (slow).

Another trend in the design of projection display systems is the use of wide-angle, high-magnification, aspheric mirrors as the element reflecting the projected image onto the display screen (e.g., as source 8 in the arrangement of FIG. 1c). It has been reported that the use of a high magnification aspheric mirror is believed to suppress color aberration.

SUMMARY OF THE INVENTION

These and other problems are generally solved or circumvented, and technical advantages are generally achieved, by embodiments of the present invention that provide a system and a method for correcting distortion in an off-axis projection display system.

In accordance with an embodiment, projection optics for a projection display system is provided. The projection optics may include a first lens group, a plurality of aspheric lenses, and one or more intermediate folding mirrors. The plurality of aspheric lenses includes at least two aspheric lenses formed of a continuous piece of lens material. The one or more intermediate folding mirrors are positioned along the optical path between the at least two aspheric lenses. An aspheric mirror may be included along the optical path subsequent to the at least two aspheric lenses to direct the light toward a screen and/or another folding mirror.

In accordance with another embodiment, a projection display system is provided. The projection display system includes a light source providing light in a first direction. A graphics driver generates control signals according to a sequence of images to be displayed, and a spatial light modulator that modulates the light from the light source responsive to the control signals. Projection optics receive light from the spatial light modulator. The projection optics include a rear group of lenses, a first aspheric lens, one or more folding mirrors, and a second aspheric lens positioned sequentially along an optical path. The first aspheric lens and the second aspheric lens are a single piece. An aspheric mirror may be included along the optical path subsequent to the at least two aspheric lenses to direct the light toward a screen and/or another folding mirror.

In accordance with yet another embodiment, an integrated dual aspheric lens is provided. The integrated dual aspheric lens includes a first aspheric lens portion and a second aspheric lens portion that has different optical properties than the first aspheric lens portion. The first aspheric lens portion and the second aspheric lens portion comprise a single piece of lens material.

The foregoing has outlined rather broadly the features and technical advantages of embodiments of the present invention in order that the detailed description of the invention that follows may be better understood. Additional features and advantages of embodiments of the invention will be described hereinafter which form the subject of the claims. It should be appreciated by those skilled in the art that the conception and specific embodiments disclosed may be readily utilized as a basis for modifying or designing other structures or processes for carrying out the same purposes. It should also be realized by those skilled in the art that such equivalent constructions do not depart from the spirit and scope of the invention as set forth in the appended claims.

BRIEF DESCRIPTION OF THE DRAWINGS

FIG. 2 is a block diagram, in schematic form, of a projection display system constructed according to the preferred embodiment of the invention;

FIG. 3a is a schematic elevation view of the arrangement of a light source and a digital micromirror device in the projection display system of FIG. 2, according to the preferred embodiment of the invention;

FIG. 3b is a schematic diagram illustrating colored light beams scrolling across the face of the spatial light modulator;

DETAILED DESCRIPTION OF ILLUSTRATIVE EMBODIMENTS

Figure 1A:
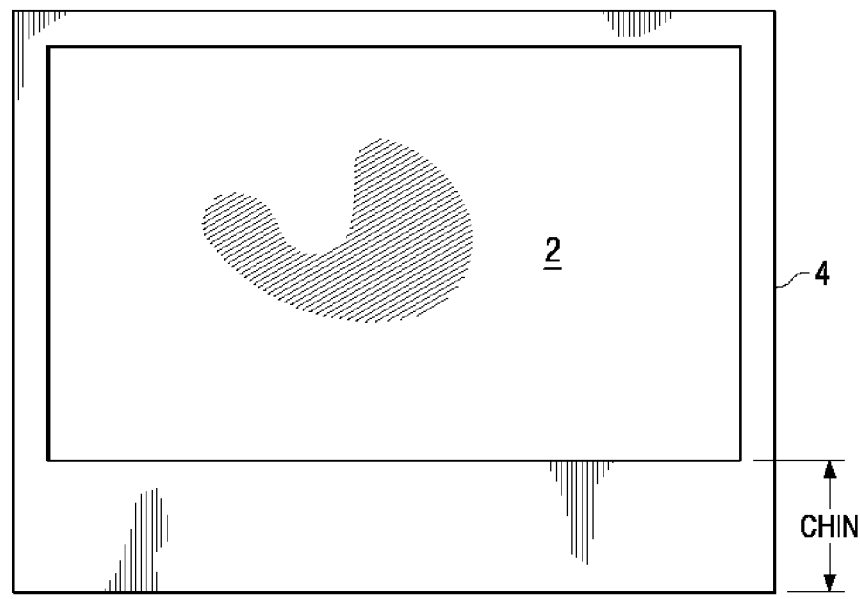
FIGS. 1a through 1c are schematic illustrations of conventional projection television displays, illustrating various dimensions therein.
Figure 1B:
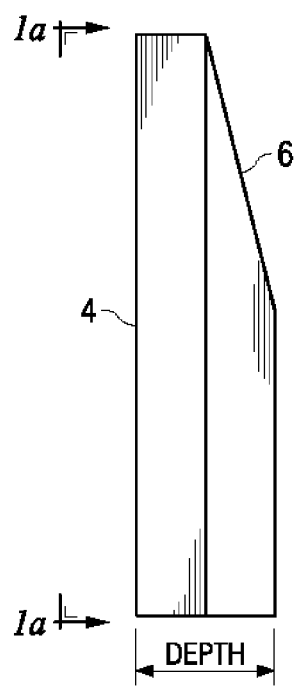
Figure 1C:
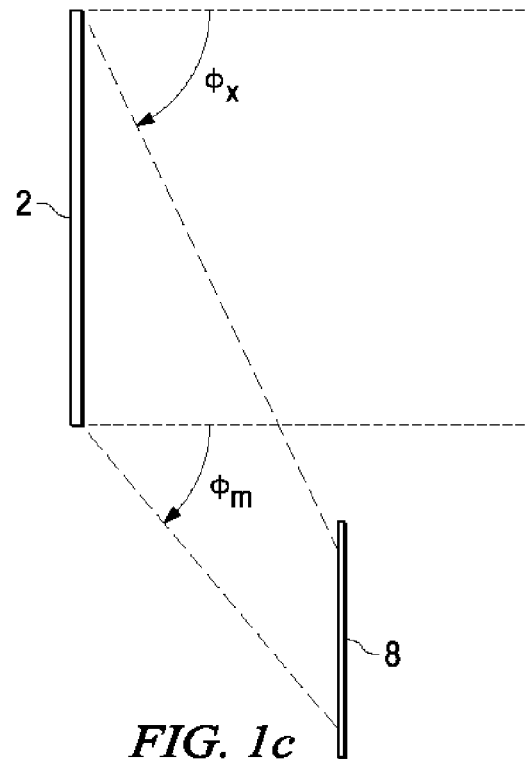

Embodiments will be described in connection with its preferred embodiment, namely as implemented into a micromirror-based projection television display system, as it is contemplated that embodiments will be especially beneficial in such a system application. It is also contemplated, however, that embodiments may be beneficial in other applications, and variations on the described television application. Accordingly, it is to be understood that the following description is provided by way of example only, and is not intended to limit the true scope of this invention as claimed.

FIG. 2 schematically illustrates the functional elements of projection display system 15 according to the preferred embodiments of this invention. The physical arrangement and construction of these elements will be described in further detail below; the illustration of FIG. 2 is presented in a functional manner, to provide functional context for that detailed description.

As shown in FIG. 2, projection display system 15 includes projection screen 12, upon which the displayed image is projected from behind (i.e., from the opposite side of screen 12 from viewer V). In this preferred embodiment of the invention, screen 12 is preferably a total internal reflection (TIR) Fresnel screen, to permit the image to be projected from an offset position from the center point of screen 12. In this case, the displayed image is projected by aspheric mirror 10 from below and behind screen 12.

According to this embodiment of the invention, light source 16 directs light of multiple primary colors at spatial light modulator (SLM) 18 in the conventional manner. Light source 16 is preferably a laser light source that directs light of at least three primary colors (e.g., red, green, blue) at SLM 18 in a time-multiplexed manner. As known in the art, other sequential primary color light sources can be constructed as a bulb-and-reflector type of white light source that illuminates a rotating color wheel having multiple colored filters; however it is contemplated, according to this embodiment, that a laser light source will be preferred, as will be apparent from the following description.

SLM 18 spatially modulates the incident light from light source 16, in response to control signals from graphics driver 14. In this preferred embodiment of the invention, SLM 18 is of the digital micromirror (DMD) type, in which a large number of individually controllable micromirrors each correspond to one pixel of the resulting image, and are each controlled in a time-sequential fashion to selectably reflect light in the desired light path according to be displayed. DMD devices suitable for use as SLM 18 are well-known in the art, for example those DMD devices in the DLP® product family available from Texas Instruments Incorporated. While one SLM 18 is illustrated in FIG. 2, and modulates light of multiple primary colors to produce a full-color displayed image, it is contemplated that embodiments are also applicable to systems that implement multiple SLM devices 18 (e.g., three SLMs 18, one each for red, green, and blue light), as will be evident to those skilled in the art having reference to this specification.

Alternatively, SLM 18 may be realized according to other technologies. Such alternative technology SLM devices include liquid crystal on silicon (LCOS) SLMs, high temperature polysilicon (HTPS) SLMs, transmissive LCD SLMs, and diffractive 1-D SLM devices. While the following description will generally refer to SLM 18 as using reflective technology, such as a DLP digital micromirror device as described above, it is contemplated that those skilled in the art having reference to this specification will be readily able to adapt embodiments for use with transmissive SLM devices such as those incorporating the technologies described above.

Typically, SLM 18 will be controlled by graphics driver 14 in a pulse-width-modulated manner, to precisely control the brightness of light reflected from SLM 18 along the desired path to be displayed on screen 12, for each primary color for each pixel. Incident light from light source 16 that is not to be part of the displayed image (e.g., light that is directed away for dark or darker pixels) is preferably recycled for efficiency. In this manner, SLM 18 spatially modulates the light that is eventually projected onto screen 12, with the modulation being controlled according to the information in the image to be displayed.

The light reflected from SLM 18 is received by projection optics 20. Projection optics 20, as will be described in further detail below, preferably includes multiple lenses arranged in multiple groups in a telecentric arrangement. The purpose of projection optics 20 is to provide a focused pattern of light of the desired size and resolution upon aspheric mirror 10. That focused pattern will, as mentioned above, reflect from aspheric mirror 10 onto the backside of screen 12. Projection optics 20 also compensate and correct for aberrations in the light pattern, and those aberrations resulting from the shape of aspheric mirror 10. The detailed construction of projection optics 20 according to the preferred embodiments of the invention will be described in further detail below.

The functional arrangement of elements shown in FIG. 2 results in a displayed image on screen 12 of high resolution, high contrast, and excellent brightness. In addition, according to this preferred embodiment of the invention, the physical elements of the light source 16, SLM 18, projection optics 20, and aspheric mirror 10 are arranged and constructed to reduce the "chin" and depth dimensions of the display system enclosure.

FIGS. 3a and 3b illustrate the construction of light source 16, and its arrangement with SLM 18, according to the preferred embodiment of the invention. As will be apparent from the following description, light source 16 is a laser-based light source, as the attributes of laser illumination are especially beneficial in display system 15 according to this preferred embodiment of the invention, for reasons discussed below. While it is contemplated that other light source types and arrangements may be used in connection with other embodiments, it is contemplated that a laser-based light source, such as light source 16 of FIGS. 3a and 3b, will be especially beneficial.

The arrangement of light source 16 as shown in FIG. 3a is believed to be conventional in the art. However, its construction and arrangement is described herein, to provide context and understanding for the preferred embodiment of the invention described below.

Laser array 22 provides the light energy involved in the projection of images in display system 15, according to this embodiment of the invention. In this example, laser array 22 includes one or more laser diodes arranged in one or more lines, for each of three or more colors. Typically, the three "primary" colors of red, blue, and green are used in projection display systems; as such, laser array 22 includes one or more lines of lasers in an array for each of these colors. As suggested by FIG. 3a, these arrays 22R, 22G, 22B (for red, green, blue, respectively) are spatially separated from one another, such that the collimated monochrome light from each array 22R, 22G, 22B travels in a plane, parallel but not coplanar with the light from the other arrays 22R, 22G, 22B. The length of each of arrays 22R, 22G, 22B (i.e., the number of solid-state laser emitters in each) corresponds to the corresponding dimension of SLM 18, so that each array 22R, 22G, 22B can illuminate a portion of SLM 18 across its width corresponding to the width of the projected image. The planes of collimated monochromatic light from arrays 22R, 22G, 22B are directed by corresponding mirrors 23R, 23G, 23B, respectively, to rotating mirror 24.

Rotating mirror 24, in this embodiment of the invention, is a rotating mirror having multiple reflective surfaces. In this example, rotating mirror 24 has a hexagonal cross-section, and is of sufficient length (in the direction normal to the page of FIG. 3a) to direct the entire width of the output from each of arrays 22R, 22G, 22B. Mirror 25 re-directs the reflected collimated light of each color from rotating mirror 24 to TIR prism 28. TIR prism 28 is a conventional "total internal reflection" prism element, which reflects or transmits incident light depending on whether the angle of incidence exceeds or is less than a critical angle for the material, as known in the art. As conventional in the art, TIR prism 28 is formed of two prism elements adjacent to each other, with a small air gap between them. TIR prism 28 reflects the collimated multiple color light to different regions of SLM 18. In this manner, it is intended that the light of each of arrays 22R, 22G, 22B will illuminate one or more rows of micromirrors in separate one-third regions of SLM 18. SLM 18 is synchronously controlled, by graphics driver 14 as discussed above, to spatially modulate the collimated light of the appropriate primary color, according to the information in the image to be displayed. The modulated light is then passed by TIR prism 28 to projection optics 20.

It is contemplated that those skilled in the optics art will be readily able to design rotating mirror 24, and TIR prism 28, and the various mirrors using conventional design techniques.

In operation, the rotation of rotating mirror 24 temporally "scrolls" colored light across SLM 18. For the position shown in FIG. 3a, red light from array 22R illuminates one or more rows of micromirrors in the upper third of SLM 18, green light from array 22G illuminates one or more rows of micromirrors in the center third of SLM 18, and blue light from array 22B illuminates one or more rows of micromirrors in the lower third of SLM 18. This situation is illustrated in FIG. 3b by DMD state 18(1). Upon rotating mirror 24 rotating in the direction illustrated, the particular rows of micromirrors illuminated by the collimated light also scroll across SLM 18. The order in which light is directed to SLM 18 changes as a vertex of rotating mirror 24 passes below the point at which red light from array 22R impinges, after which the red light is reflected at a shallower angle, and is directed via mirror 25 and TIR prism 28 to one or more rows of micromirrors in the lower third of SLM 18; meanwhile, the steeper reflection angle of the surface of rotating mirror 24 at this time will direct green light to one or more rows of micromirrors in the upper third of SLM 18, and blue light to one or more rows of micromirrors in the center third of SLM 18, as shown in FIG. 3b by DMD state 18(2). The scrolling continues in this manner, with blue light eventually being directed to one or more rows of micromirrors in the upper third of SLM 18, during which time red light is directed to one or more rows of micromirrors in the center third of SLM 18, and green light is directed to one or more rows of micromirrors in the lower third of SLM 18. The process then repeats.

As known in the art and as mentioned above, during such time as light of a particular color is directed to micromirrors of SLM 18, graphics driver 14 synchronously controls the operation of those micromirrors to selectively modulate the incident light into or out of the light path to be projected onto screen 2, depending upon the content of the image to be displayed. In this manner, the operation of SLM 18 is controlled to include information in the light reflected through TIR prism 28 to projection optics 20.

Figure 3C:
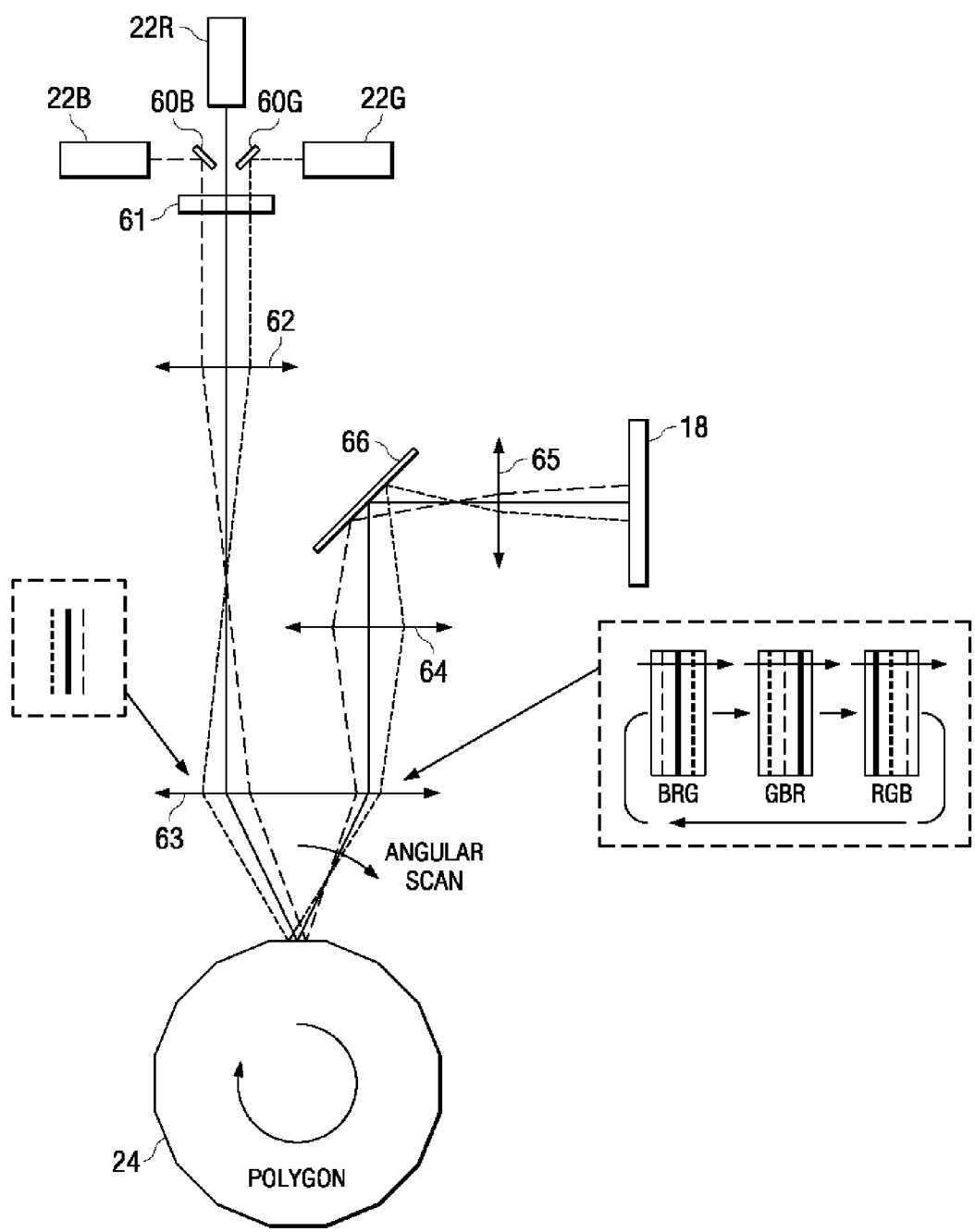
FIG. 3c is a schematic diagram illustrating the projection display system of FIG. 3a in greater detail, according to the preferred embodiment of the invention.

FIG. 3c illustrates an example of a scanning projection system such as that discussed above with reference to FIG. 3a. In this embodiment, light from the blue array 22B the green array 22G are reflected by mirrors 60B and 60G, respectively, to a lenticular laser line generator 61. Light from the red array 22R is also directed to the lenticular laser line generator 61. The light from the arrays 22R, 22G, and 22B are directed through a laser relay lens 62, thereby presenting static lines of laser light on the F-Theta lens 63. The F-Theta lens 63 directs the laser light to the rotating mirror 24. In operation, the rotating mirror 24 reflects the light from the F-Theta lens 63, but as the rotating mirror 24 rotates, the angle of reflection changes. As a vertex of the rotating mirror passes a line of light, such as the green light, the angle of reflection decreases, thereby causing the line of light presented on the projection side of the rotating mirror 24 to rotate to the left, as indicated in FIG. 3c. Relay optics 64 and 65, and mirror 66 shape and condition the light for the SLM 18. Other lens and/or prisms may be used in addition to or instead of those illustrated in FIG. 3c.

Referring back to FIG. 2, projection optics 20, according to this preferred embodiment of the invention, includes a rear group of glass lenses of spherical curvature, and a front group of aspheric plastic lenses, with one or more mirrors disposed within the lenses of these groups, as will be described below. As will be evident from the following description, the construction and arrangement of the lenses within projection optics 20 are a significant factor in permitting the enclosure of display system 15 to have minimal chin and depth dimensions.

Figure 4A:
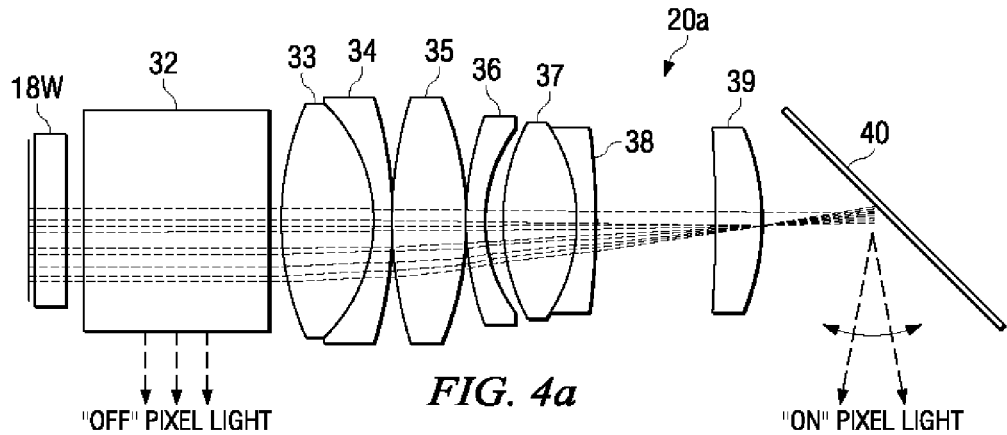
FIGS. 4a through 4c are schematic elevation views of projection optics in the projection display system of FIG. 2, according to the preferred embodiment of the invention.

Referring now to FIG. 4a, the construction and arrangement of rear group 20a of projection optics 20 will be described in detail, following the path of light in the direction from SLM 18 to screen 2. A first element of rear group 20a is window 18W of SLM 18; as typical in the art, window 18W is merely a transparent protective glass window, and does not affect the path of transmitted light. According to this preferred embodiment of the invention, the light from both "on" pixels and "off" pixels are transmitted by window 18W to the next element of rear group 20a, which is total internal reflection (TIR) prism 32.

As known in the art, TIR prism 32 serves to direct light into different paths, depending upon the angle of incidence of that light as compared to a critical angle. TIR prisms, such as TIR prism 32, are conventionally used at the output of a DMD device, to pass desired light beams from those pixels that are to be displayed, and to reflect away the light beams from those pixels that are to be "dark." TIR prism 32 may be constituted as including TIR prism 28 of light source 16, with an additional surface to reflect and transmit the "off" and "on" pixel light modulated by SLM 18, or alternatively may be a separate TIR prism from prism 28. In either case, the modulated light reflected from SLM 18 is directed at a high incident angle such that it passes through the TIR surface of the TIR prism and through the air gap therein. If the angle of incidence of a given light beam at the TIR surface of TIR prism 32 is less than the critical angle, it is reflected away as shown in FIG. 4a ("OFF" PIXEL LIGHT). Modulated light at an angle of incidence greater than the critical angle is transmitted by TIR prism 32 along the projection path, toward the lens elements 33 through 39 of rear group 20a. In another embodiment, the optics may be arranged such that a reverse TIR prism is utilized. In this embodiment, the light from an "off" pixel is directed at the reverse TIR prism such that the "off" pixel light passes through the TIR surface of the TIR prism, and the light from an "on" pixel is reflected toward the lens elements 33 through 39 of rear group 20a.

Lenses 33 through 39 are each spherical glass lenses, arranged on the optical axis of the light from SLM 18 through TIR prism 32. None of lenses 34 through 39 are tilted, and the aperture of none of these lenses is clipped. Details of the construction of lenses 33 through 39, according to this example of the preferred embodiment of the invention, are provided in Table 1:

TABLE 1

| radius of curvature (mm) | thickness (mm) | material | element diameter (mm) | Lens surface |
|---|---|---|---|---|
| ∞ | 0.844 | air | 22.082 | space from TIR 32 to lens 33 |
| 28.436 | 9.2 | S-NSL5 glass | 23.3 | lens 33 |
| −16.705 | 2 | S-LAH58 glass | 23.3 | lens 34 |
| −48.5 | 0.099 | Air | 24.6 | space from lens 34 to lens 35 |
| 47.975 | 7.4 | S-FPL53 glass | 24.9 | lens 35 |
| −29.832 | 0.07 | air | 24.9 | space from lens 35 to lens 36 |
| 26.593 | 2 | S-LAH64 glass | 21.5 | lens 36 |
| 15.455 | 2 | air | 19.2 | space from lens 36 to lens 37 |
| 23.713 | 7.5 | S-NSL36 glass | 20.2 | lens 37 |
| −15.073 | 1.9 | S-LAH58 glass | 19.66 | lens 38 |
| −134.532 | 12.509 | air | 19.66 | space from lens 38 to lens 39 |
| −317 | 5.018 | S-NSL3 glass | 19.4 | lens 39 |
| −24.178 | 64.778 | air | 19.4 | space from lens 39 to aspheric lens 42 |

As evident from FIG. 4a, and as those skilled in the art will realize from the example of the lens construction of Table 1, lenses 33 through 39 of rear group 20a constitute a "telecentric" multi-element lens group, in that the chief rays for all points across the object defined by window 18W are parallel to the optical axis through lenses 34 through 39. As known in the art, the optical properties of telecentricity are beneficial in many ways. For purposes of this embodiment, one important benefit of telecentricity is that distortion due to position across the object plane (window 18W) is eliminated. In addition, position of the object plane (window 18W) relative to the lenses does not affect the image size in a telecentric lens system, reducing the sensitivity of the relative position of these elements to one another and thus facilitating manufacture of the system. As such, the design of a telecentric lens system such as lenses 33 through 39 in this embodiment of the invention, in combination with a collimated light source such as laser light source 16, reduces the sensitivity of projection optics 20 to defocus and to misalignment of SLM 18.

However, as discussed above, the current trend in projection display systems is to use non-telecentric projection lens systems. Because the non-parallel chief rays from the object plane converge in a non-telecentric lens system, the diameter of the projection lenses can be greatly reduced, relative to the dimensions of the object plane. This enables "slower" (i.e., larger f-number) lenses to be used in the projection lens system, which greatly reduces aberrations from the lenses themselves, reduces the complexity of the projection lens system, and greatly reduces the cost of the lenses themselves.

According to the preferred embodiment of this invention, however, the use of laser-based light source 16 enables the construction of rear group 20a of projection optics 20 as a telecentric lens system, within the physical constraints of the enclosure of projection system 15 and at reasonable cost. The concept of "etendue" is useful in the optical art, and refers to the geometric or spatial capability of an optical system to transmit or receive light. In the context of an SLM-based system, the source of light incident on the SLM has an etendue that corresponds to the size and directionality of the source; the SLM also has an etendue that corresponds to its size and ability to receive light from various directions. As known in the art, lamp and LED light sources tend to have large source etendue values, relative to the SLM that is being illuminated. This mismatch indicates that only a fraction of the light emitted by the source is useful in the projection system. In other words, the light "cone" emitted by both lamp and LED light sources subtends a wide angle, relative to the aperture defined by the SLM. As such, for a desired brightness level, the lamp or LED light source is required to be of relatively high power.

In contrast, a laser-based light source, such as light source 16 discussed above, has a relatively low source etendue level, for example on the order of 100 times smaller than that of a conventional lamp or LED light source. As such, the source etendue of laser light source 16 is preferably well-matched to the etendue of SLM 18, in projection system 15 according to this preferred embodiment of the invention.

From an optical standpoint, the lower source etendue of laser-based light source 16 corresponds to a narrower angle of the incident light "cone." In other words, the effective diffraction "aperture" defined by each pixel of SLM 18 is narrower for light from a lower etendue source, such as laser-based light source 16, than it is for a higher etendue source, such as a lamp or LEDs. It has been observed, in connection with this embodiment, that this smaller or narrower aperture permits "slower" lenses (i.e., lenses with higher f-numbers) for optical correction and focus to be used, for a given resolution.

This effect of low source etendue on the f-number of the projection lenses compensates for the lower f-number lenses, and more complex arrangement of such lenses, that are required to realize a telecentric lens system. For example, the f-number of rear group 20a of projection optics 20, constructed to include lenses 33 through 39 as described above, is about f/2.8 or higher (i.e., slower), for the case of a laser-based light source 16 and a DMD-based SLM 18 measuring 0.45" in width. It has been demonstrated and observed, in connection with this embodiment, that the use of laser-based light source 16 enables such relatively slow f-number optics as rear group 20a, in consideration with other factors such as geometrical lens aberration (e.g., spherical aberration that is dependent on aperture) on one hand, and MTF diffraction effects that "blur" the pixel resolution from slower lenses, on the other hand. As such, the use of laser-based light source 16, as described above, enables rear group 20a of projection optics 20 to be telecentric at virtually no cost, while keeping the lens speed and size reasonable, and while permitting the "throw" distances of the projection lenses to also be modest. Indeed, it is believed that the use of a lamp or LED light source with the telecentric projection lens rear group 20a would not result in a projected image of optimum quality (e.g., adequate quality for today's high-definition television marketplace), without greatly increasing the throw distances of the lenses beyond the desired size of the enclosure of projection system 15. Accordingly, the combination of laser-based light source 16 with the telecentricity of rear group 20a of projection optics 20, provides important advantages in the construction of a mirror-based projection display system, especially in the form factor of such a system as will be described below.

Alternatively, light source 16 may be realized by way of one or more light-emitting diodes (LEDs), for example one or more LEDs for each of the primary colors. Conventional LED-based light sources or "engines" are known that provide one LED for each of the red, green, and blue primary colors, or an array of LEDs for each primary color (e.g., six LEDs for each of red, green, and blue). As mentioned above, the source etendue of an LED-based light source 16 is greater than a laser-based source, which requires a wider aperture for rear group 20a of projection optics 20, and perhaps a larger SLM 18. For example, it is contemplated that use of an LED-based light source 16 will require the f-number of rear group 20a to be f/2.0, for a DMD-based SLM 18 measuring 0.65" in width. But even with this additional constraint on rear group 20a, it is contemplated that an LED-based light source 16 may be implemented in projection system 15, according to this embodiment, while still providing an enclosure with low "chin" and "depth" measurements as will be described below.

Referring back to FIG. 4a, the light for "on" pixels that is transmitted through lenses 33 through 39 is then directed at optical actuator 40. Optical actuator 40 is a fully-reflective plane mirror that redirects the path of the light projected from last lens 39. According to the preferred embodiment of the invention, optical actuator 40 is slightly "dithered" between two angles relative to the optical axis of lenses 33 through 39. In this regard, it is contemplated that optical actuator 40 includes a motor or other mechanism for controllably positioning its reflective surface at a selected one of at least two different angles, relative to the optical axis of rear group 20a. It is contemplated that this motor or mechanism will be controlled by circuitry within projection system 15, for example by graphics driver 14 itself, or by other circuitry that is synchronized to graphics driver 14.

As known in the art in connection with the SMOOTH PICTURE™ technology developed and available from Texas Instruments Incorporated, odd-numbered image pixels can be assigned to one subframe of an image frame, and even-numbered image pixels can be assigned to a second subframe. The timing control signals applied to SLM 18 can be similarly divided. In displaying the image, optical actuator 40 is placed at one angle relative to the optical axis of lenses 34 through 39 for one subframe, and is placed at a second angle relative to the optical axis for the next subframe; the angles of optical actuator 40 are selected so that the difference between these two positions, in projected light path at screen 2, is about one-half pixel width. Typically, the pixels of SLM 18 are diamond-shaped, such that the light beam or ray from a given pixel is shifted in the direction orthogonal to that defined by optical actuator 40, also by one-half the pixel width. As such, optical actuator 40 not only directs the projected light along its path in a different direction from that of lenses 34 through 39, but also implements the SMOOTHPICTURE™ technology so that the resulting resolution of the displayed image is greatly improved.

Figure 4B:
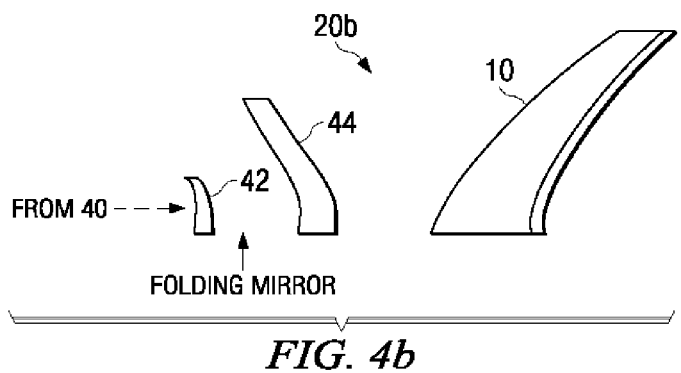

Projection optics 20 of projection system 15, according to this embodiment of the invention, also includes front group 20b of lenses. FIG. 4b illustrates the optical arrangement of front group 20b; as will be described below, the physical arrangement of front group 20b differs from its effective optical path, for purposes of minimization of depth.

As shown in FIG. 4b, front group 20b includes three aspheric elements, namely aspheric meniscus lenses 42, 44, and aspheric mirror 10. According to the preferred embodiment of this invention, as shown in FIG. 4b, each of these aspheric elements is constructed of optical acrylic plastic. This permits each of aspheric elements 42, 44, 10 to be physically "clipped" at or near its optical axis of these elements, because the optical path utilizes only a portion of the entire aspheric surface. This greatly facilitates the positioning of these aspheric elements within the enclosure of display system 15. In addition, as will also be described in further detail below, sufficient space is provided between aspheric lens 42 and aspheric lens 44 for a two-surface folding mirror, which will bend the light path back on itself to save additional form factor volume.

Figure 4C:
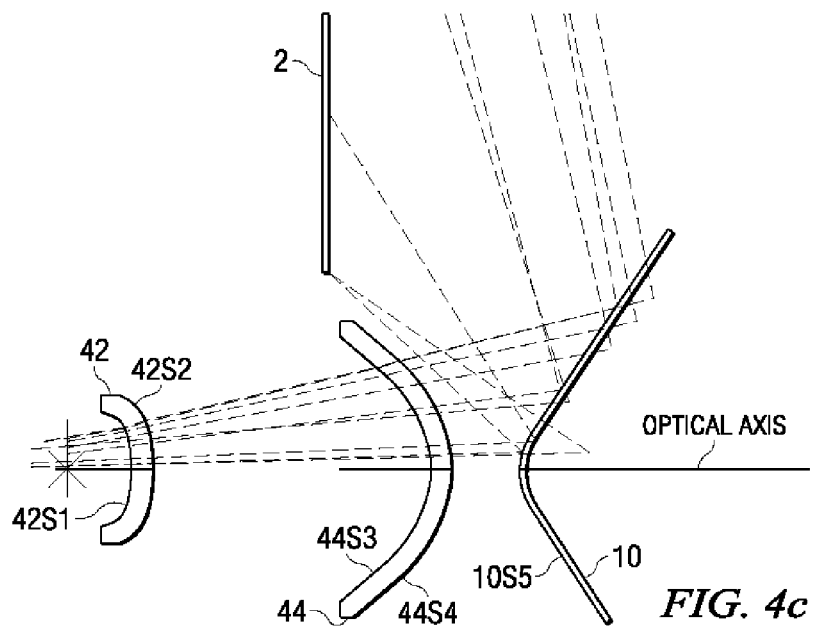

According to this embodiment of the invention, aspheric lenses 42, 44 are constructed to operate as a medium-to-wide angle projection lens system, which reduces the magnification required of aspheric mirror 10. The detailed construction of aspheric elements 42, 44, 10 will now be discussed in connection with the diagram of FIG. 4c, in which each of these elements 42, 44, 10 are shown in an "unclipped" form, for clarity in the description of their construction.

According to the preferred embodiment of the invention, each of elements 42, 44, 10 are formed of optical acrylic plastic, having surfaces that are each defined as a rotationally or axially symmetric polynomial aspheric surface. These surfaces can be described by way of a polynomial expansion of a deviation from a surface that is spherical, or aspheric defined as a conic (e.g., nearly "axiconic"). In this example, the surfaces of elements 42, 44, 10 are "even" asphere surfaces, as only even powers of the polynomial expansion are used (odd powers are zeroed) because of the axial symmetry. The lateral distance, or surface "sag," z from the front apex of the surface to a radial point r from the vertex of the aspheric surface along the optical axis, is commonly defined according to $$z = \frac{cr^2}{1 + \sqrt{1-(1+k)c^2r^2}} + a_1r^2 + a_2r^4 + a_3r^6 + a_4r^8 + a_5r^{10} + a_6r^{12}$$

where k is the "conic coefficient" for the surface, and where c is the curvature (1/radius) of the base sphere (from which the asphere deviates) at the vertex, and the coefficients $a_i$ are the aspheric coefficients defining the shape of the asphere.

Specific values used to define the surfaces of elements 42, 44, 10 in an example of the preferred embodiment of the invention are specified in Table 2, in which the lens surfaces 42S1, 42S2, 44S3, 44S4 refer to the surfaces of lenses 42, 44 as shown in FIG. 4b, and in which the surface 10S5 refers to the substantially axiconic reflective surface of aspheric mirror 10:

TABLE 2

| lens surface | clear aperture output (~physical radius, in mm) | radius of curvature (mm) | C (reciprocal of radius of curvature (mm$^{-1}$) | k |
|---|---|---|---|---|
| 42S1 | 21.4 | 20.814 | 0.04804454 | −7.435999 |
| 42S2 | 26.3 | 24.102 | 0.04148992 | −0.3095901 |
| 44S3 | 51.6 | 17.453 | 0.05729674 | −9.0506895 |
| 44S4 | 54.7 | 30.081 | 0.03324395 | −12.303 |
| 10S5 | 91.3 | −13.516 | −0.07398622 | −2.887278 |

| lens surface | $a_1$ | $a_2$ | $a_3$ | $a_4$ | $a_5$ | $a_6$ |
|---|---|---|---|---|---|---|
| 42S1 | 0 | −3.712239E−05 | 2.621195E−07 | −5.760937E−10 | 8.906940E−13 | −3.383627E−16 |
| 42S2 | 0 | −9.963297E−05 | 3.197044E−07 | −5.579417E−10 | 5.586180E−13 | −2.430105E−16 |
| 44S3 | 0 | 1.732750E−05 | −2.334335E−08 | 1.638530E−11 | −5.311442E−15 | 6.322489E−19 |
| 44S4 | 0 | 1.604374E−05 | −1.786992E−08 | 1.062825E−11 | −3.009051E−15 | 3.174648E−19 |
| 10S5 | 0 | 9.390947E−08 | 7.529221E−12 | −3.619127E−15 | 4.031248E−19 | −1.584210E−23 |

It is contemplated that those skilled in the art having reference to this description will be able to readily construct aspheric lenses 42, 44, and aspheric mirror 10 as suitable for a particular system application, without undue experimentation. In this example, the optical path length from lens 39 to aspheric lens 42, via optical actuator 40, is about 64.78 cm, the optical path length from aspheric lens 42 to aspheric lens 44, via folding mirror 48, is about 53 cm, and optical path length from aspheric lens 44 to aspheric mirror 10 is about 22 cm. Each of these paths is through air. FIG. 4b illustrates the general paths of projected light through lenses 42, 44, as reflected by aspheric mirror 10 to screen 2.

Figure 8A:
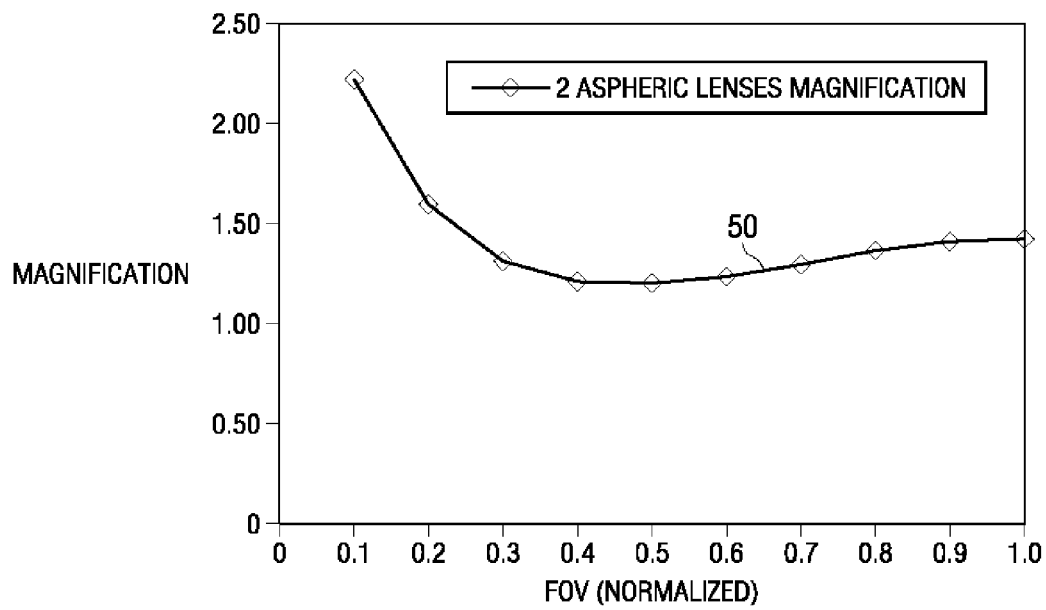
FIGS. 8a and 8b are plots of magnification over normalized field of view for lens and mirror elements in the projection display system of FIG. 2, according to the preferred embodiment of the invention.
Figure 8B:
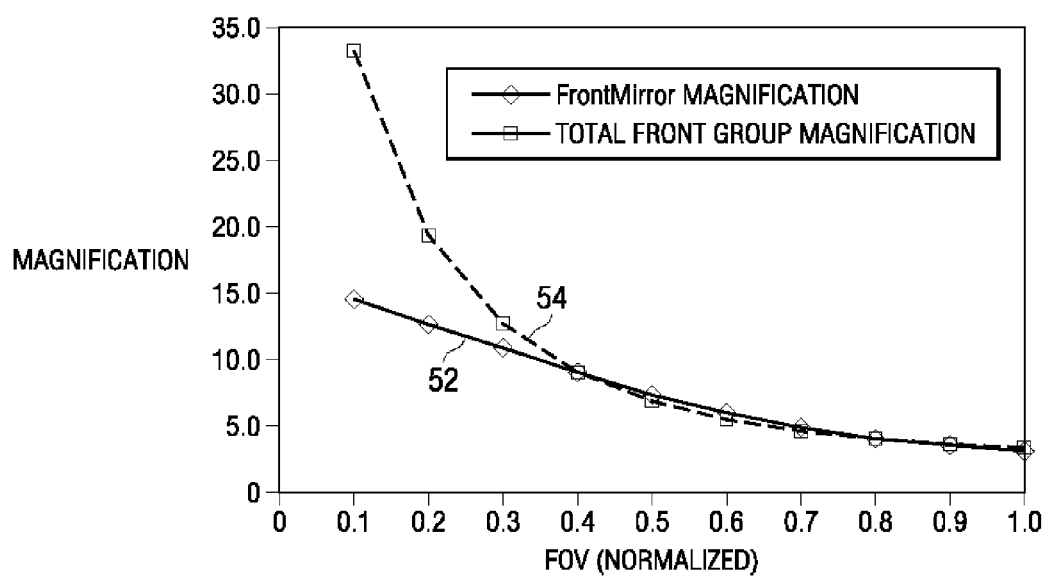
Figure 8C:
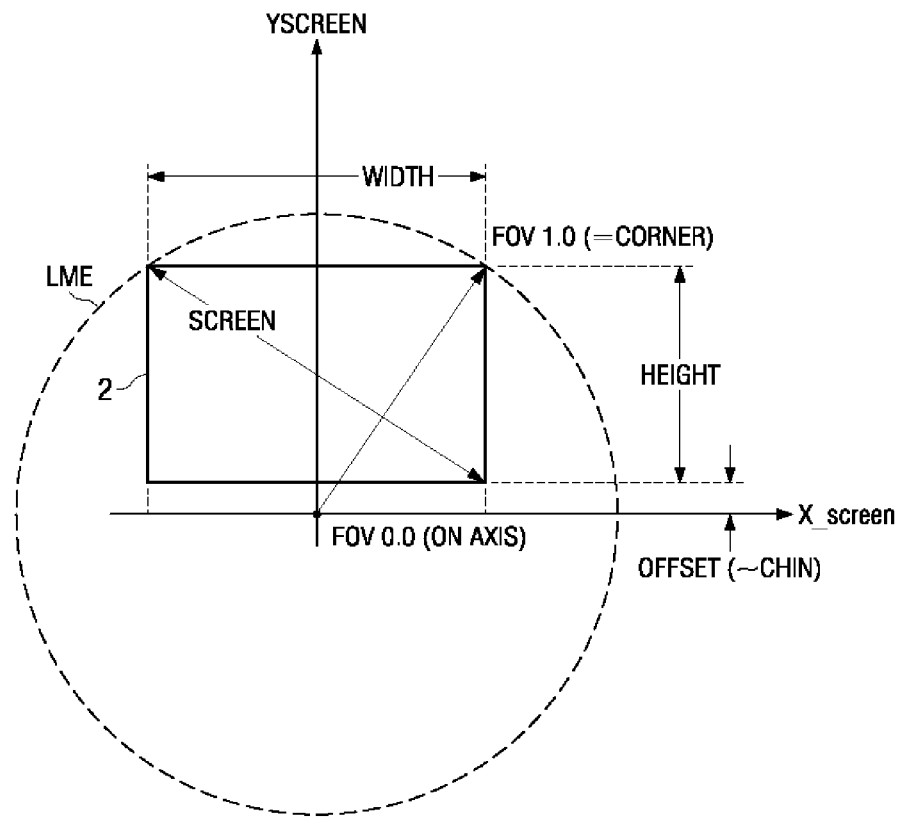
FIG. 8c is a geometric illustration defining normalized field of view, for purposes of describing the performance of the projection system according to the preferred embodiment of the invention.

According to this preferred embodiment of the invention, it is contemplated that the magnification power of aspheric lenses 42 and 44, in combination is greater than 1.0. For the example of aspheric lenses 42, 44 described above, the magnification power of these two lenses is shown by curve 50 of FIG. 8a, as varying between about 2.25 and 1.25 over normalized field of view (FOV) values ranging between about 0.1 and 1.0, with the minimum magnification at about 0.5 of FOV, normalized. FIG. 8c illustrates the definition of normalized field of view, ranging from the radial distance at the optical axis of the lens or mirror element LME (having a normalized FOV value of 0.0) to the point on the surface of the lens or mirror corresponding to the pixel at the diagonal corner of the image displayed on screen 2 (normalized FOV of 1.0). This >1.0 magnification power of aspheric lenses 42, 44 reduces the magnification power required of aspheric mirror 10 according to this preferred embodiment of the invention, relative to conventional systems. Curve 52 of FIG. 8b illustrates the magnification of aspheric mirror 10 over normalized FOV between about 0.1 and 1.0, as varying from about 15.0 to about 3.5; it is contemplated that this magnification by aspheric mirror 10 is substantially less than that of conventional projection systems using a substantially larger aspheric mirror than aspheric mirror 10 in this embodiment of the invention, such conventional systems generally including a single aspheric lens element that does not substantially magnify the image. The arrangement of plastic aspheric lenses 42, 44 according to this embodiment of the invention results in this smaller size for aspheric mirror 10, because the complexity of the system of aspheric lenses 42, 44 defines an optimum distance between aspheric mirror 10 and rear group 20a; this optimum distance does not necessarily impact the depth of the enclosure, but enables the smaller size for front aspheric mirror 10.

In addition, it has been observed, in connection with this invention, that conventional projection systems involving an aspheric projection mirror will typically have only the final aspheric lens element formed of an optical plastic, with all other lens elements formed in glass. In contrast, the arrangement of this embodiment enables both aspheric lenses 42, 44 to be formed of optical acrylic plastic, reducing the cost of the system and also permitting "clipping" of these lenses in the manner illustrated in the Figures and described herein.

Figure 8D:
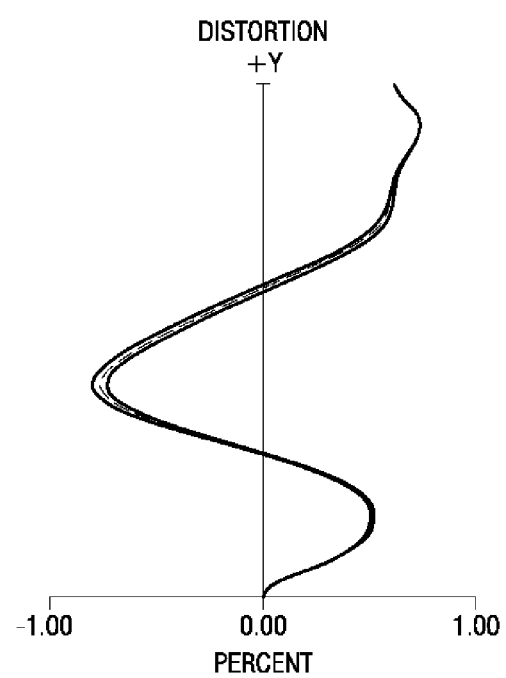
FIG. 8d is a plot of distortion over normalized field of view for the projection system of FIG. 2 constructed according to the preferred embodiment of this invention.

By way of further description, curve 54 of FIG. 8b illustrates the total magnification of the "front group" of aspheric lenses 42, 44 in combination with aspheric mirror 10. While the magnification at low normalized FOV points are greatly magnified by these aspheric elements 42, 44, 10, it has been observed, in connection with this embodiment, that projection optics 20, including aspheric mirror 10, has outstanding distortion performance. FIG. 8d illustrates the distortion exhibited by an example of projection system 15 according to this preferred embodiment of the invention, as measured over normalized FOV from 0.10 to 1.00 (bottom to top along the y-axis). As evident from this plot, the overall distortion of the system remains within 1.00% over the entire image range, which is excellent performance for this scale of optical system.

Figure 5A:
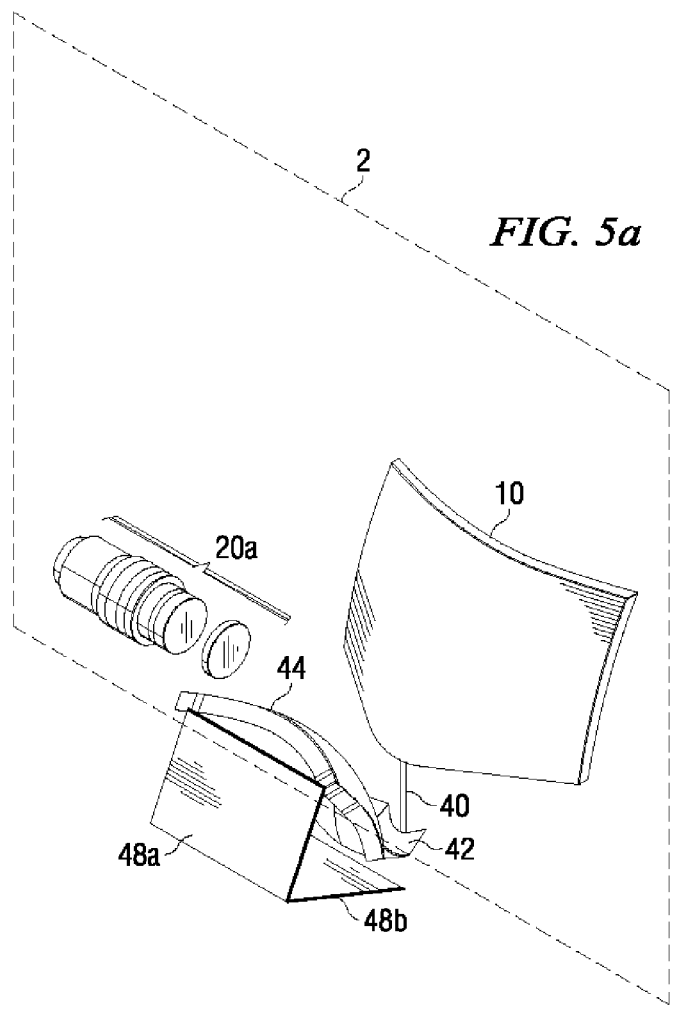
FIGS. 5a through 5d are schematic views of the arrangement of the projection optics and aspheric mirror in the projection display system of FIG. 2, according to the preferred embodiment of the invention.

As discussed above relative to FIG. 4b, aspheric lenses 42, 44, and aspheric mirror 10 are physically clipped to save volume within the form factor of the enclosure of projection system 15. This clipping results in the surface cross-section of aspheric lenses 42, 44, and aspheric mirror 10 residing substantially within a single half-plane, as shown in FIG. 4b. In addition, also as discussed above relative to FIG. 4b, the distance between aspheric lenses 42, 44 is selected to be sufficient to insert a two-panel folding mirror between these elements, to direct the light path in an efficient manner within the enclosure of projection system 15. Referring now to FIG. 5a, the arrangement of rear group 20a and front group 20b of projection optics 20, according to the preferred embodiment of the invention, will now be described.

FIG. 5a is a perspective view of projection optics 20, including folding mirror 48, which has two surfaces 48a, 48b, and including screen 2 (a portion of which is shown in phantom). As illustrated in FIG. 5a, rear group 20a is oriented so that its optical axis is generally parallel to the plane of screen 2, with the path of its projected light diverted substantially perpendicularly by optical actuator 40. The precise angular relationship of this optical axis to screen 2 is not important, as the light path is controlled by optical actuator 40. However, the arrangement of rear group 20a to be generally parallel to the plane of screen 2 permits the depth of an enclosure for display system 15 to be minimized. Aspheric lens 42 is positioned so that its optical axis is generally in the perpendicular plane relative to screen 2, and receives the projected light as reflected by optical actuator 40.

Folding mirror 48 is constructed as two planar reflective panels that are at a selected angle (generally perpendicular) relative to one another, and that are disposed in the light path between aspheric lens 42 and aspheric lens 44. Aspheric lens 42 is oriented in substantially the reverse direction, relative to aspheric lens 44 from the optical arrangement of FIG. 4b. As shown in FIG. 5a, the presence of folding mirror 48 enables aspheric lens 44 to reside substantially above aspheric lens 44, within the physical arrangement of projection system 15. Aspheric lens 44 is aimed at aspheric mirror 10, which in turn is positioned to direct projected light to screen 2. The folding mirror 48 may be constructed as a multi-piece or a single-piece mirror. One example of a single-piece mirror is disclosed in U.S. patent application Ser. No. 11/948,426, entitled "Rear-Projection Screen for Projection Video Display System, Method of Rear-Projection Collimation and Projection Video Display System Incorporating the Same," filed on Nov. 30, 2007, which is hereby incorporated herein by reference.

Figure 6:
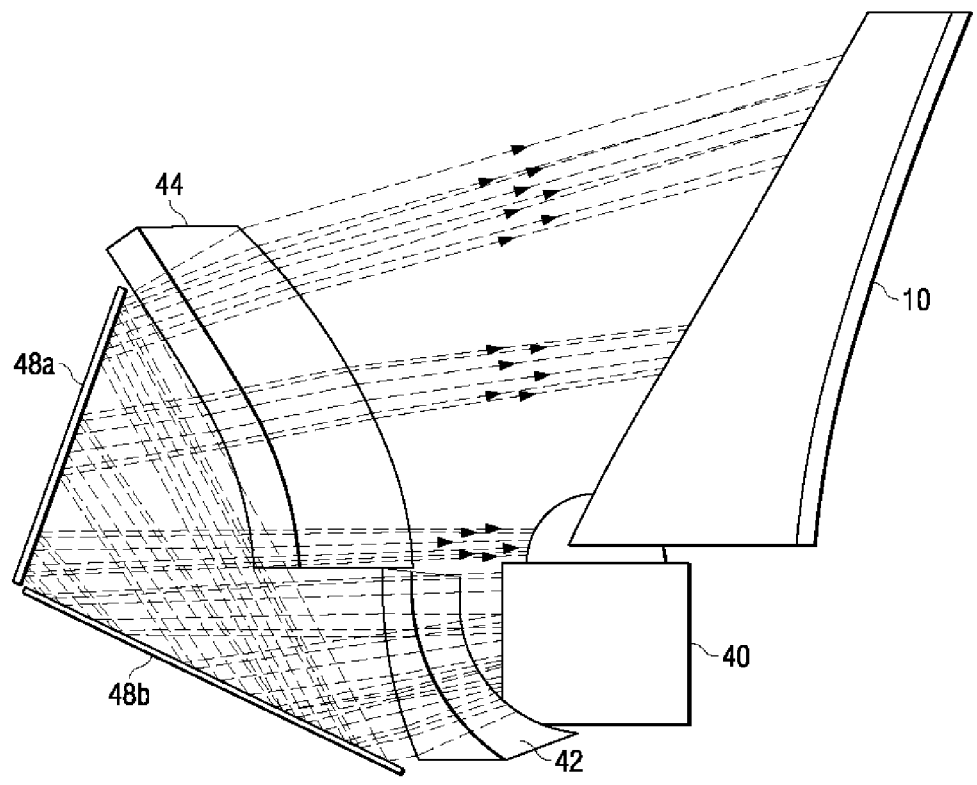
FIG. 6 is a schematic perspective view of the arrangement of portions of the projection optics and the aspheric mirror in the projection display system of FIG. 2, according to the preferred embodiment of the invention, illustrating the various light paths therein.

FIG. 6 illustrates the light path from optical actuator 40 to screen 2. In this arrangement, the light projected from rear group 20a and reflected by optical actuator 40 is then transmitted by aspheric lens 42 toward bottom panel 48b, and reflected from bottom panel 48b to top panel 48a, from which the light is reflected to aspheric lens 44. Aspheric lens 42 magnifies the image of the projected light, as evident from the diverging light rays illustrated in FIG. 6. The light reflected from top folding mirror panel 48a is then further magnified by aspheric lens 44, and projected onto the surface of aspheric mirror 10, which in turn reflects the projected light toward screen 2. As discussed above relative to FIGS. 8a and 8b, it is contemplated that the magnification applied by aspheric lens 44 (and, to a lesser extent, by aspheric lens 42) reduces the curvature and magnification of aspheric mirror 10, improving the overall resolution and fidelity of the projected image.

Figure 5B:
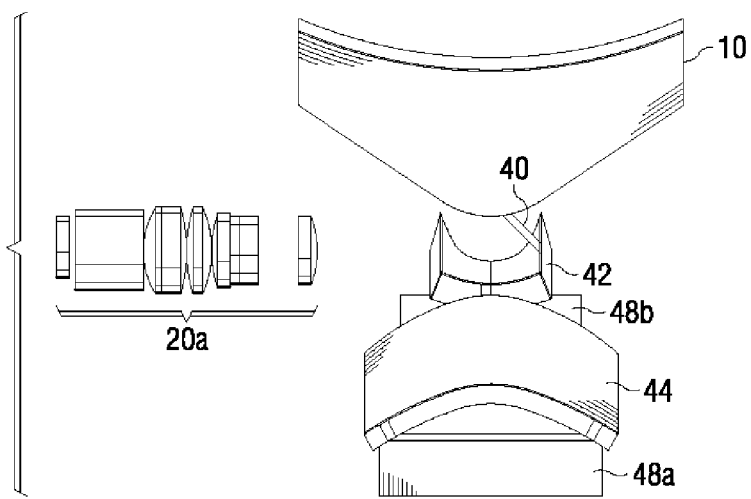
Figure 5C:
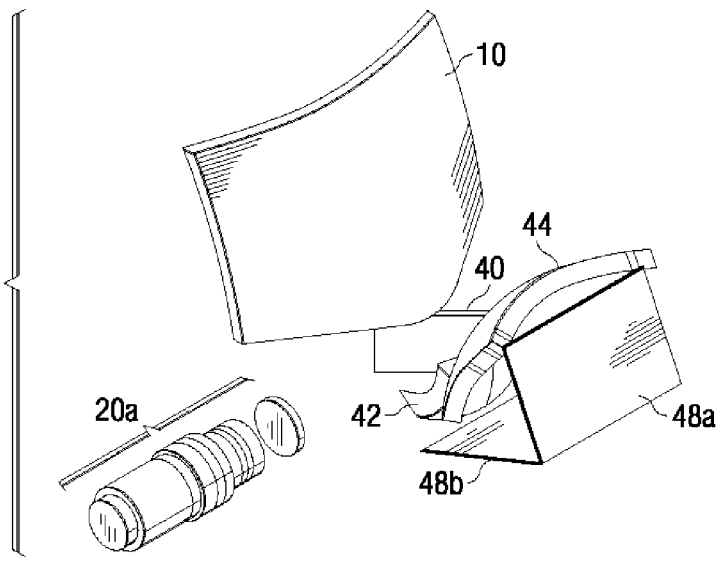
Figure 5D:
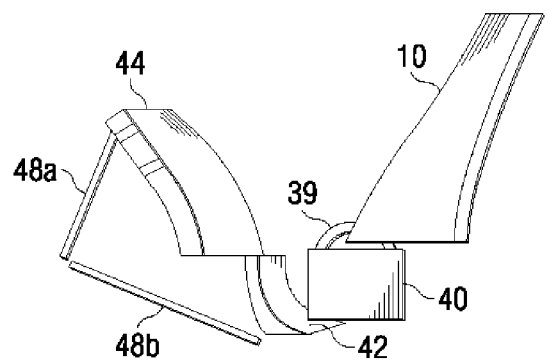

FIG. 5b illustrates the physical arrangement of projection optics 20 within projection system 15 in a top-down view, further illustrating the physical relationship of aspheric lenses 42, 44 to one another, and to the other elements. FIG. 5c is a perspective view of these elements from the opposite direction from that shown in FIG. 5a, and further illustrates the reflecting surface of optical actuator 40. And FIG. 5d is an elevation view from the same side as shown in FIG. 5a, but in a direction that is substantially parallel to the plane of screen 2.

Figure 7:
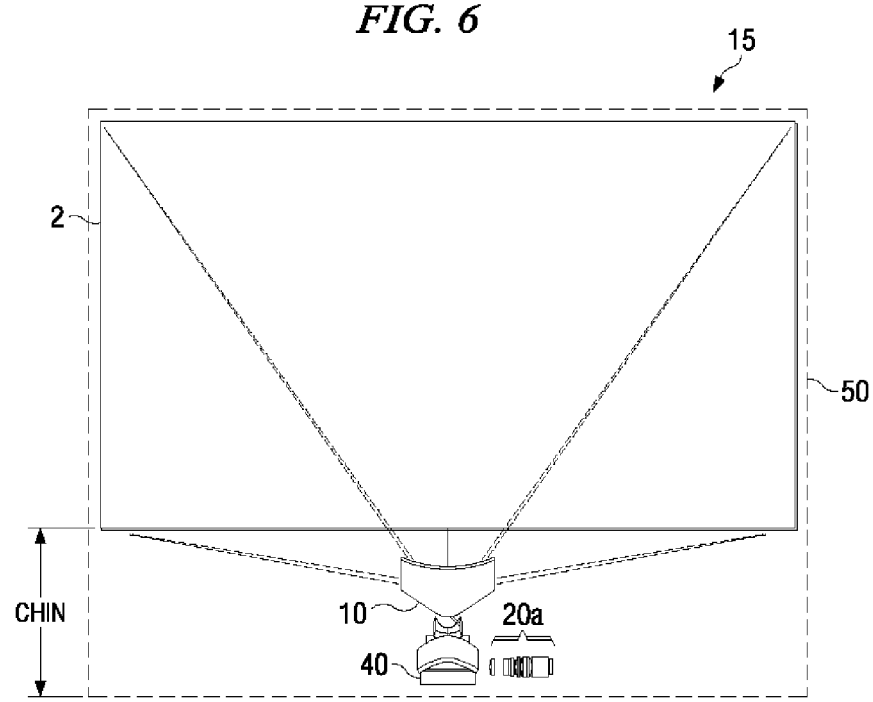
FIG. 7 is a schematic elevation view illustrating the arrangement of the projection optics and aspheric mirror with the display screen in the projection display system of FIG. 2, according to the preferred embodiment of the invention.

As evident from FIGS. 5a through 5d and FIG. 6 and the above description, the arrangement of projection optics 20 and aspheric mirror 10 enables the enclosure of these elements within a volume that is competitive with LCD and plasma display systems, especially in connection with the important dimensions of the "chin" and depth of the system enclosure. FIG. 7 illustrates the relative position of projection optics 20 and aspheric mirror 10, in connection with a rear view of display system 15. In actual implementation, enclosure 50 (shown in shadow in FIG. 7) surrounds the system components, including screen 2 and projection optics 20, aspheric mirror 10, light source 16 (not shown in FIG. 7) and the other elements of projection system 15.

In this example, screen 2 is a 44-inch widescreen (16:9 aspect ratio) projection screen, upon which projection optics and aspheric mirror 10 are capable of projecting a full resolution image. It is contemplated that enclosure 50 can provide sufficient volume for the elements of projection system 15 in a manner that is quite efficient. For this example, and given the example of the construction described above, it is contemplated that enclosure 50 for this 44-inch system 15 can contain these elements within a "chin" dimension (from the bottom of screen 2 to the base of enclosure 50, as shown) of 6 inches or less (and an "optical" chin dimension, corresponding to the vertical offset from the optical axis of aspheric mirror 10 to the bottom of screen 2, of 4 inches or less), and a depth (from the front of screen 2 to the rear of the enclosure) of about 6 inches or less. These dimensions, for a 44-inch projection display system 15, are similar to current-day LCD and plasma display systems available in the marketplace.

The minimal chin and depth dimensions are attained by projection system 15, while meeting other important constraints in the design of the system. One important constraint that is met by projection system 15 according to this preferred embodiment of the invention is the minimum angle (from the normal) of incident light reflected from aspheric mirror 10 to screen 2. As known in the art and as described above, this minimum angle of incidence is required of TIR Fresnel screens such as screen 2, in order to eliminate flare and non-uniform contrast in the projected image. According to this preferred embodiment of the invention, even with the minimal chin and depth measurements specified above, the minimum angle of incidence $\phi m$, at the worst case location of the bottom of screen 2, is greater than 50°.

Projection system 15 constructed according to this preferred embodiment of the invention is capable of being housed in enclosure 50 of this small form factor, while projecting an image of excellent resolution. It has been observed, according to this embodiment, that projection optics 20 in projection system 15 provide excellent (>50%) response even at high spatial frequencies (>0.65 cycles per mm), over the screen 2. In addition, because of the telecentricity of rear group 20a of projection optics 20, excellent stability of the image dimension is maintained over relatively wide focus shifts. Distortion and lateral color shift are also minimized according to this design. As such, projection system 15 according to this embodiment of the invention is fully capable of accurately and precisely projecting modern "high definition" images.

Figure 9A:
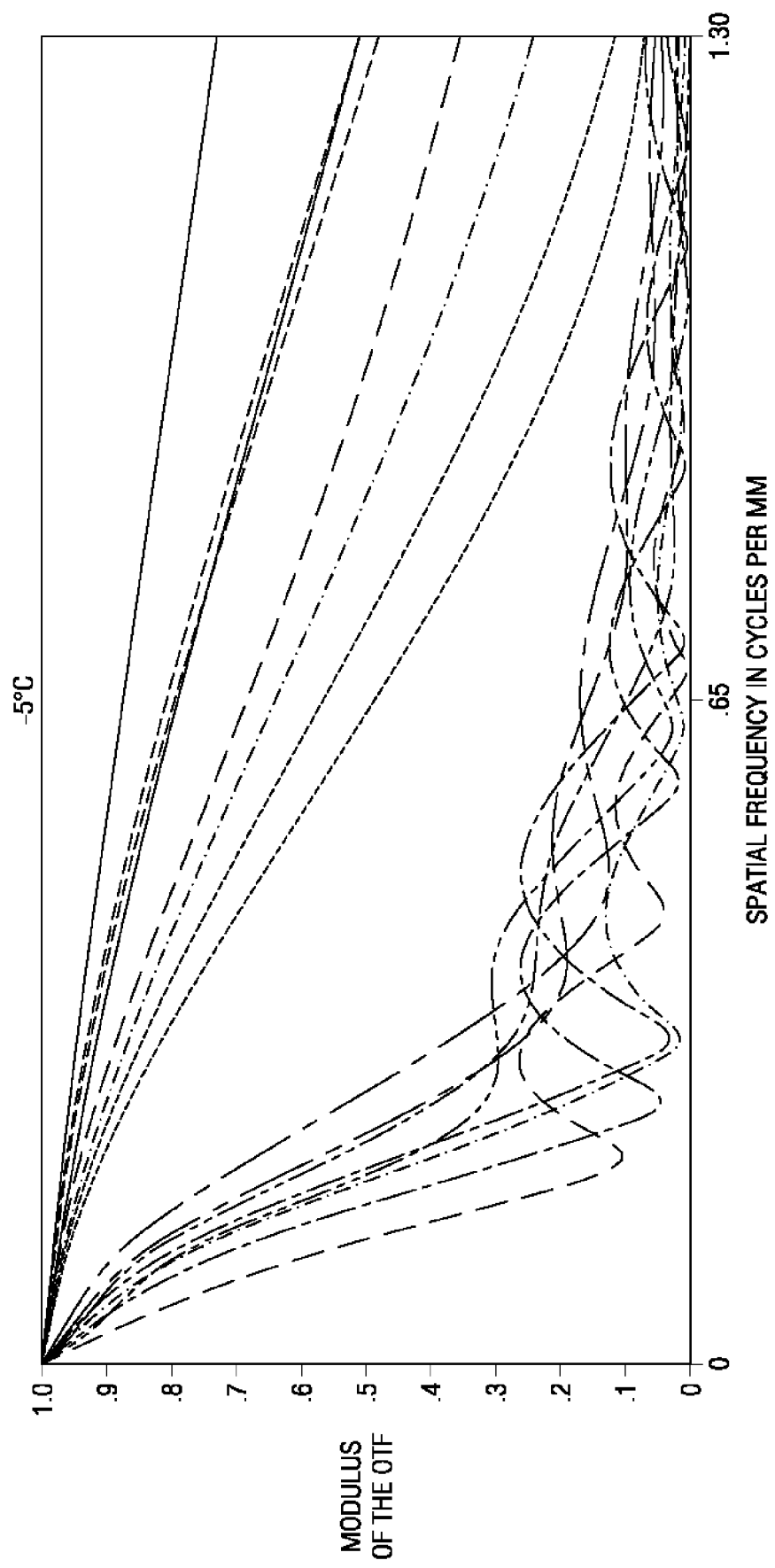
FIGS. 9a through 9c are plots of modulation transfer function (MTF) over resolution for a conventional projection display system at varying temperature.
Figure 9B:
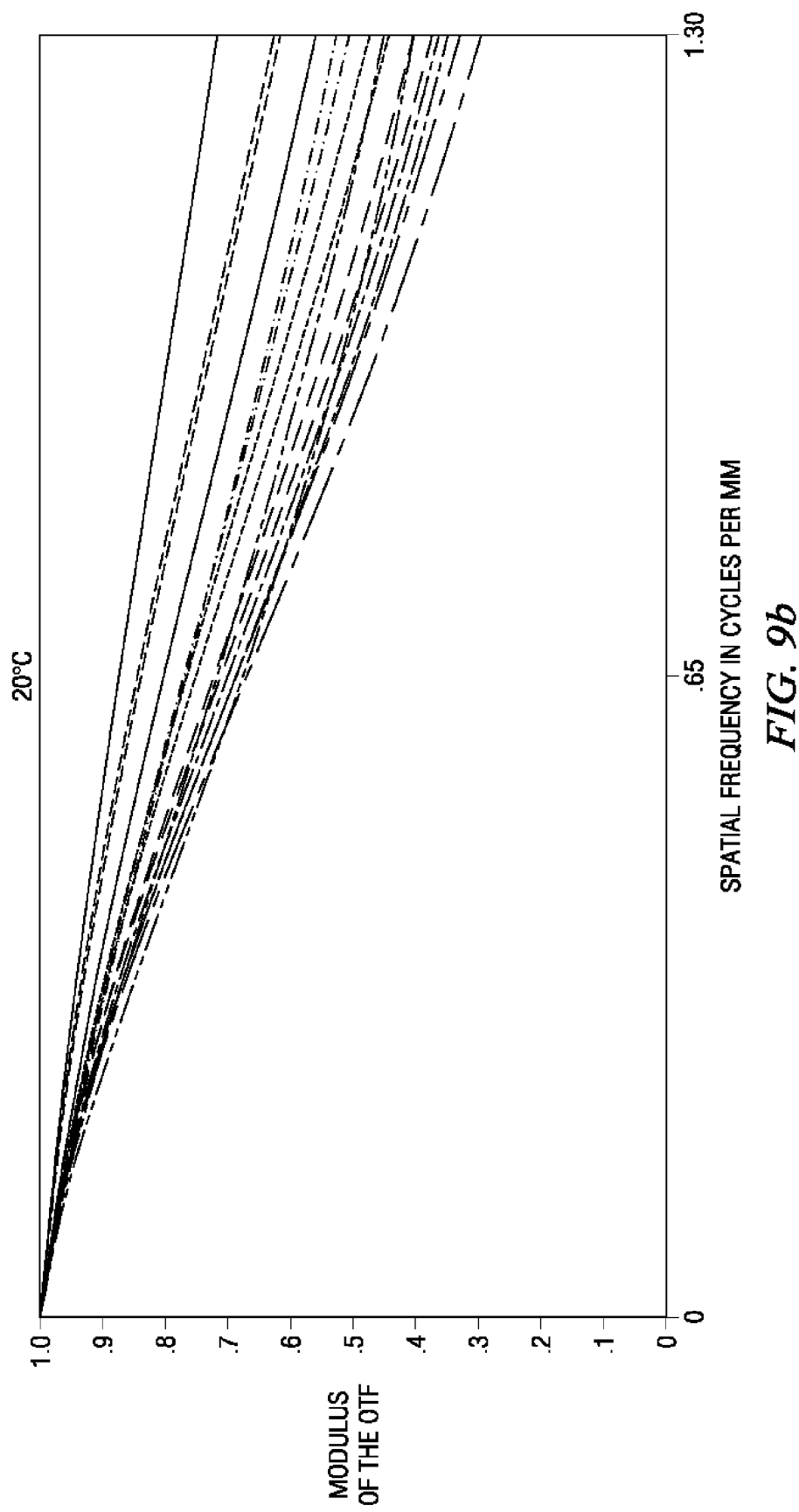
Figure 9C:
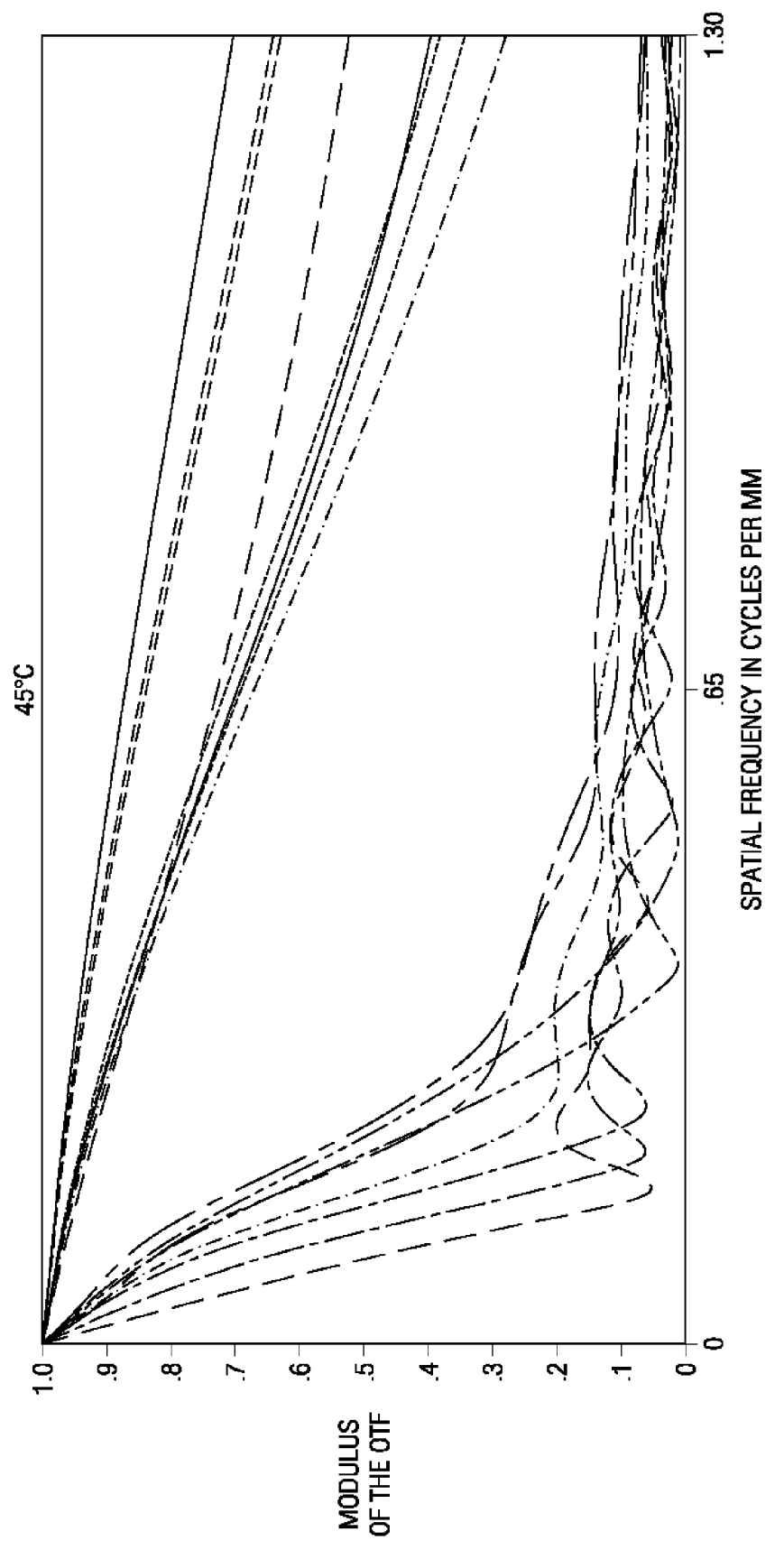

In addition, it has been discovered and observed that this embodiment provides the additional important benefit of greatly improved stability over variations in temperature and humidity in the system environment. It has been observed that conventional projection systems, for example DMD-based projection systems using only an aspheric mirror, suffer from loss of resolution over variations in temperature and humidity, due to the effects of such environmental variations on the aspheric mirror. FIGS. 9a through 9c illustrate the modulation transfer function (MTF), expressed as the modulus of the DTF ranging from 0.0 to 1.0, over spatial frequency in cycles per millimeter, for a conventional single aspheric mirror system at temperatures of −5° C., +20° C., and +45° C., respectively. As shown in FIG. 9b, the resolution performance is quite good for this conventional system; however, the higher and lower temperature performance is dramatically poorer, with poor resolution (as poor as 0.13 at 0.65 cycles per mm) exhibited for these temperatures.

Figure 9D:
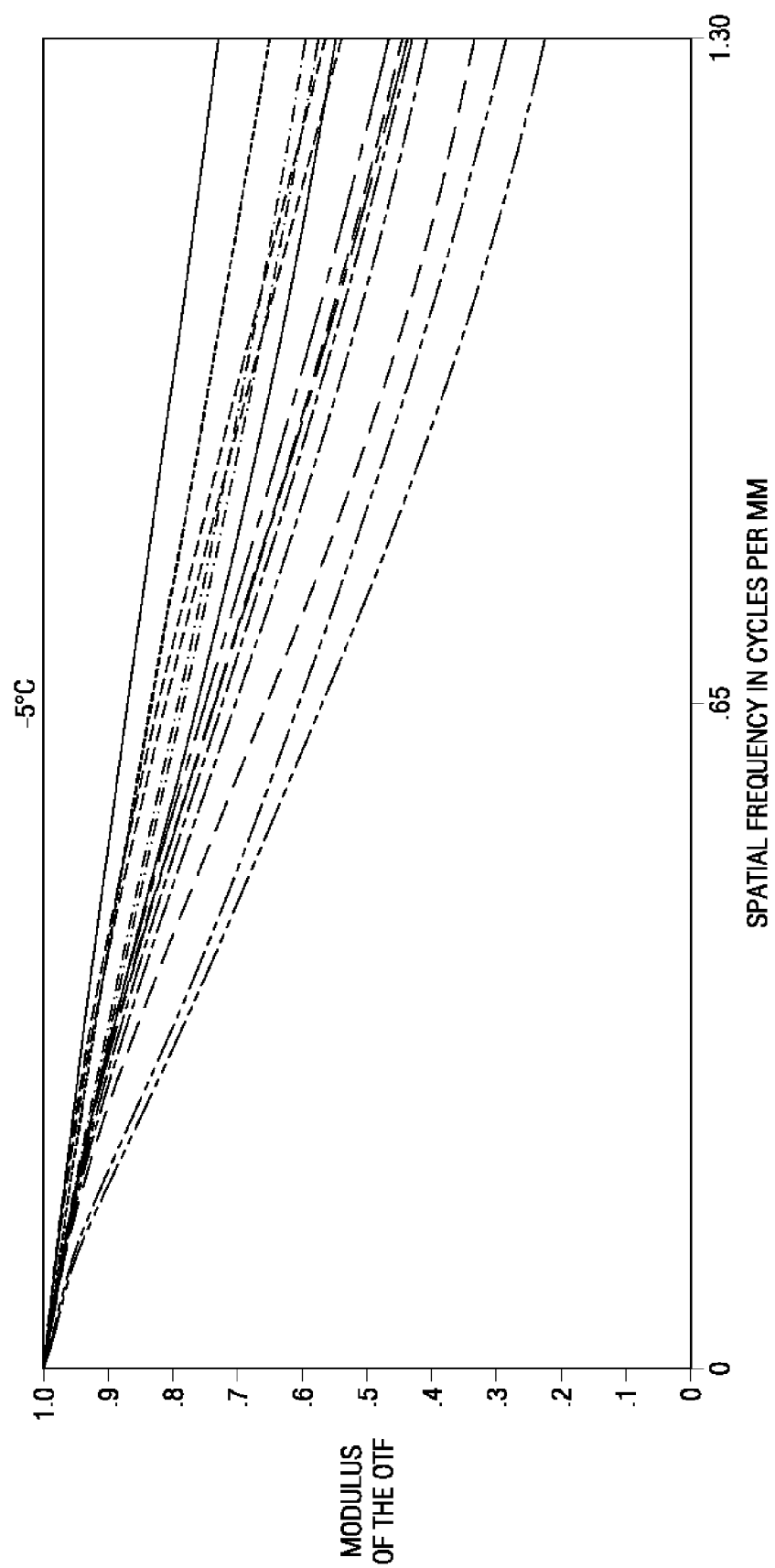
FIGS. 9d through 9f are plots of MTF over resolution at varying temperature for the projection display system of FIG. 2, according to the preferred embodiment of the invention.
Figure 9E:
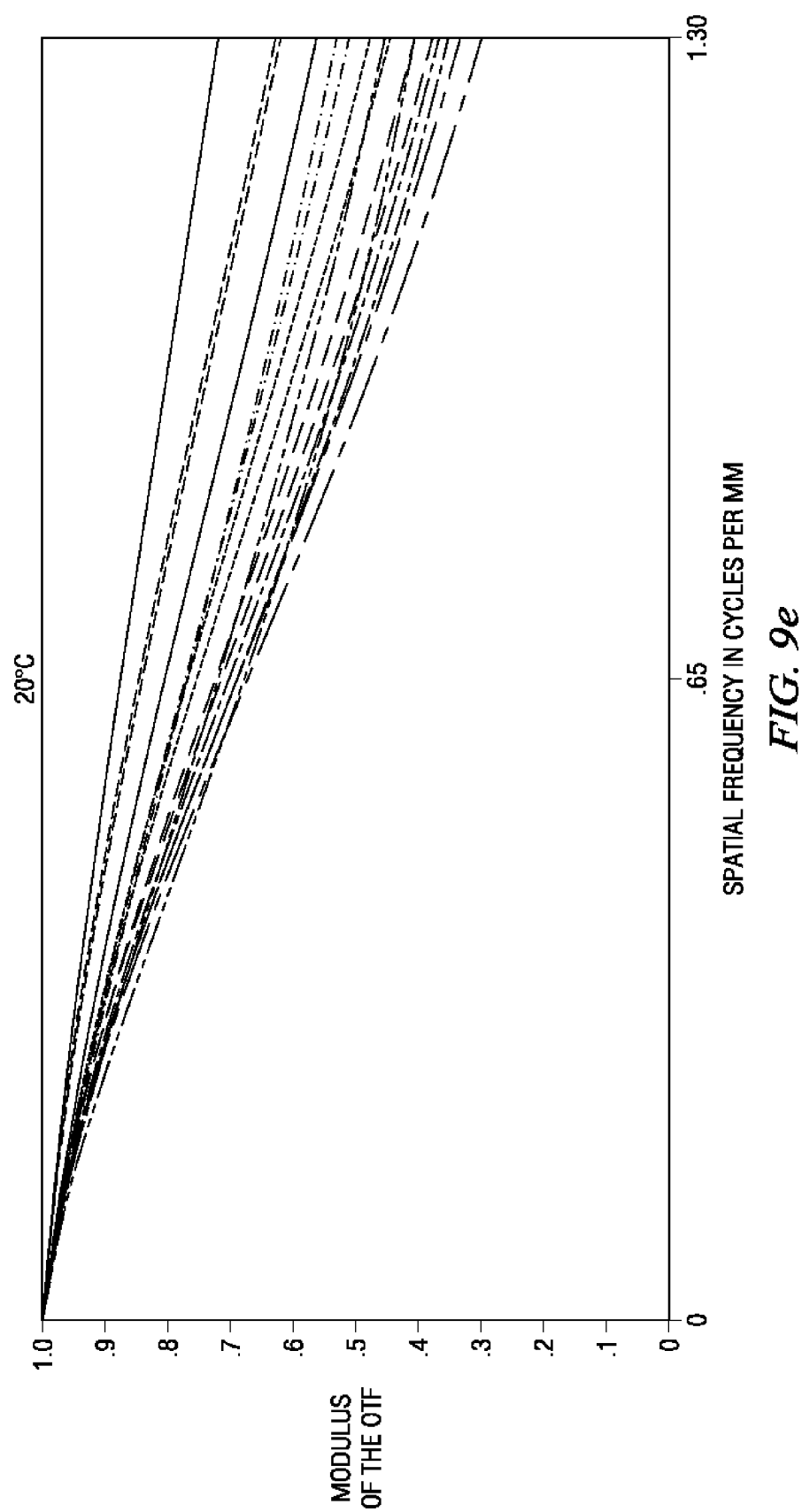
Figure 9F:
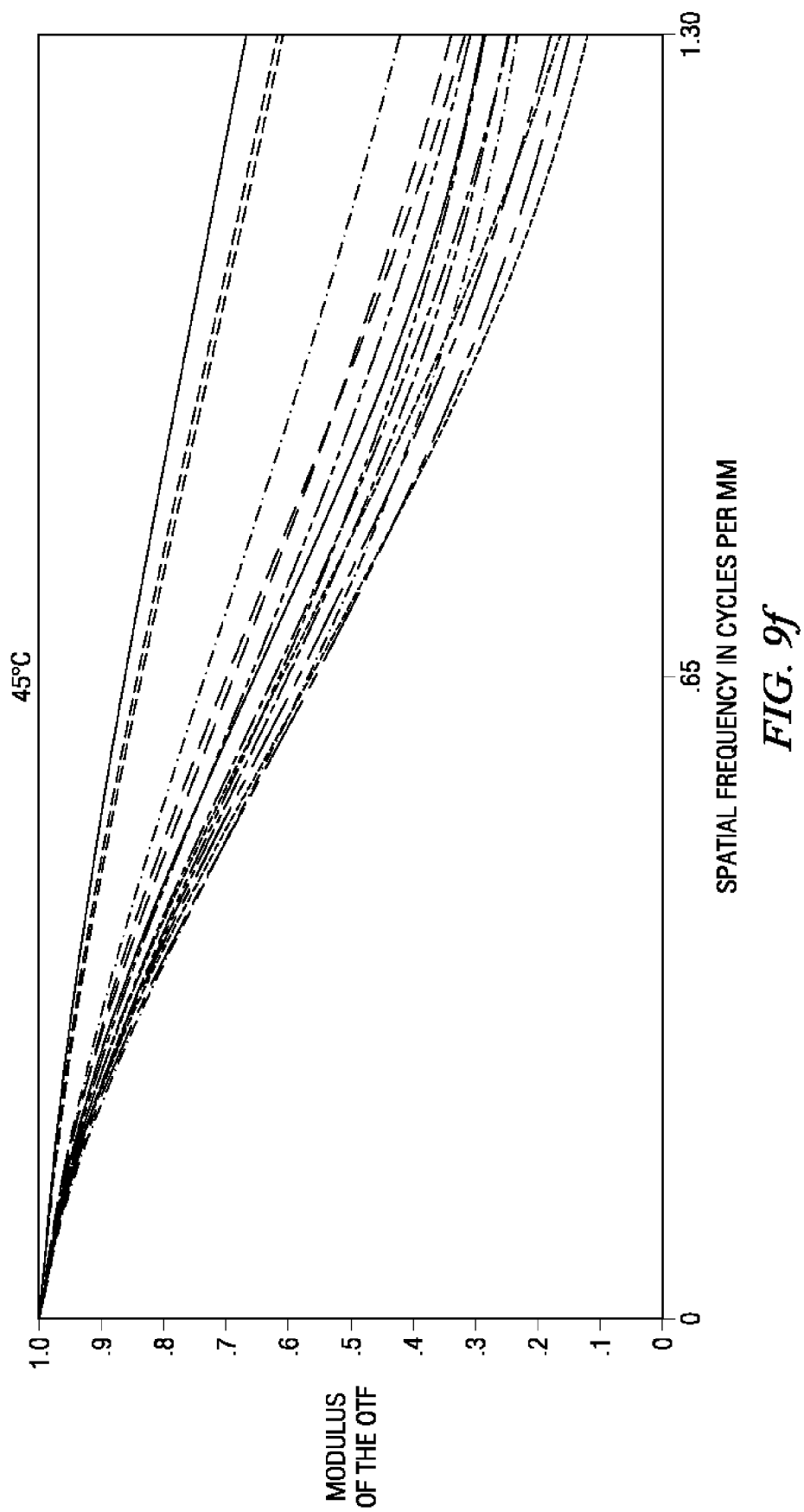

On the other hand, projection system 15 according to this preferred embodiment of the invention provides relatively good stability over temperature, as exhibited by FIGS. 9d through 9f at temperatures of −5° C., +20° C., and +45° CC., respectively. As evident from these plots, the degradation in resolution over temperature is much reduced for projection system 15, relative to the conventional system for which performance is shown in FIGS. 9a through 9c. It is believed, according to this embodiment, that this improved stability is because any thermal dilation of plastic aspheric mirror 10 will be compensated by substantially equivalent thermal expansion of plastic aspheric plastic lenses 42, 44, which presents the opposite effect of the dilation of aspheric mirror 10. Conventional systems using only a single plastic aspheric mirror do not have this compensating effect, resulting in the poor thermal performance illustrated in FIGS. 9a through 9c.

It is also contemplated that, because of this improved thermal stability, the plastic aspheric lenses 42, 44 and plastic aspheric mirror 10 of projection system 15 according to this embodiment can be constructed to be stable over temperature in a system using a plastic baseplate, thus reducing manufacturing cost and also reducing mechanical stress due to thermal mismatch between the plastic lenses and the baseplate.

Furthermore, the nature of DMD-based projection systems such as display system 15 according to this preferred embodiment of the invention lends itself well to scaling to larger screen sizes. As such, it is contemplated that the ratio of chin and depth of enclosure 50, to the size of screen 2, will be the same or better as the size of screen 2 is scaled upward. These larger screen display DMD-based display systems are contemplated to be less expensive than corresponding LCD and plasma systems, given the scalability of the DMD projection engine relative to those other technologies.

Figure 10:
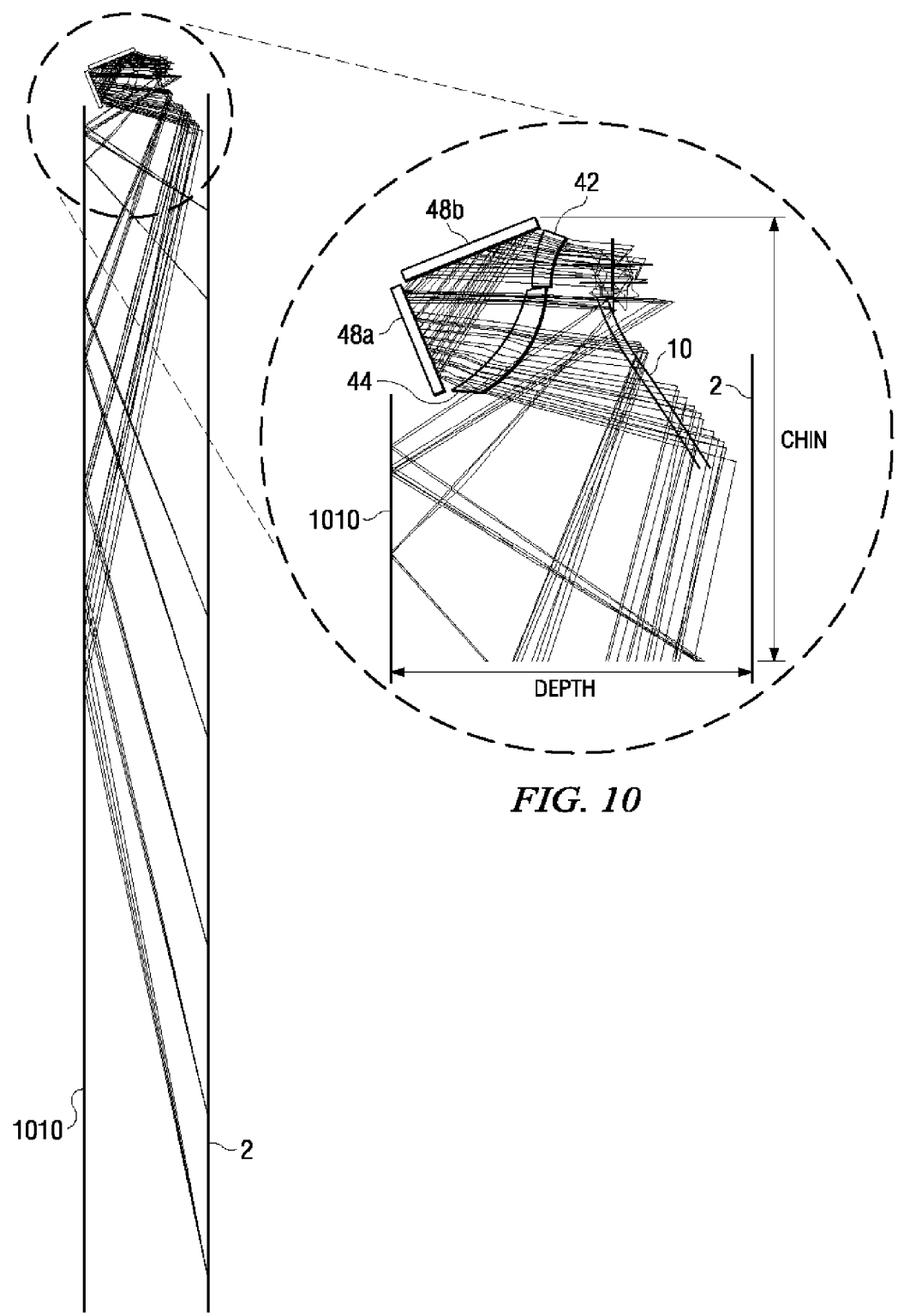
FIG. 10 is a geometric illustration of the optical path of a projection system using a folding mirror after an aspheric mirror in accordance with an embodiment.

FIG. 10 illustrates an embodiment in which a folding mirror 1010 is utilized to allow a longer optical path with a thinner cabinet. In this embodiment, a planar folding mirror 1010 is placed such that light from the aspheric mirror 10 is reflected back to the screen 2. By creating a longer optical path, greater magnification and hence larger screen sizes, may be obtained. Methods and systems for utilizing the folding mirror 1010 are disclosed in U.S. patent application Ser. No. 11/959,277, entitled "Optical System for a Thin, Low-Chin, Projection Television," filed on Dec. 18, 2007, which is hereby incorporated herein by reference It should be noted that the folding mirror 1010 is illustrated as being parallel to the screen 2 for illustrative purposes only. In some embodiments, it may be desirable to tilt the folding mirror relative to the optical axis of the projection lens to induce a keystone effect to offset aberrations caused by the optics, such as, for example, third-order residual distortions like pincushion distortions or barrel distortions. The SLM and/or the projection optics may also be tilted to induce a positive or negative keystone distortion. Methods and systems for inducing a keystone distortion are disclosed in U.S. patent application Ser. No. 11/948,811, entitled "Off-Axis Projection System and Method," filed on Nov. 30, 2007, which is hereby incorporated herein by reference.

Figure 11A:
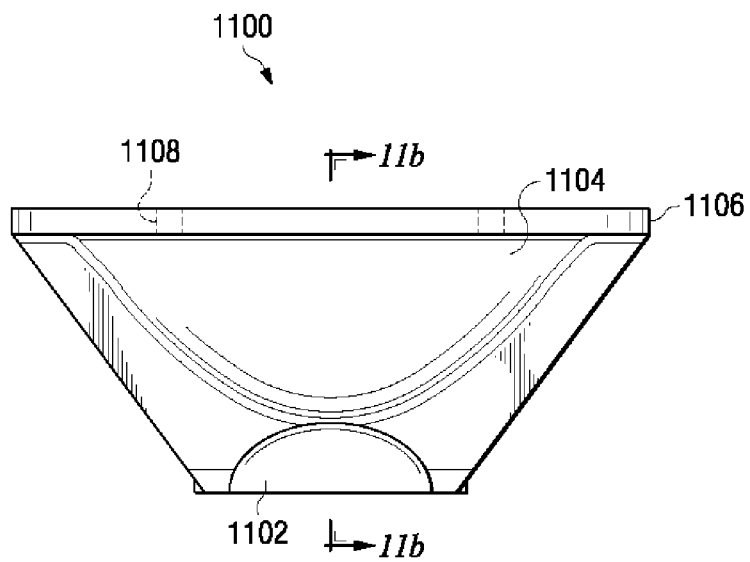
FIG. 11a-11d are illustrations of an integrated dual aspheric lens in accordance with an embodiment.
Figure 11B:
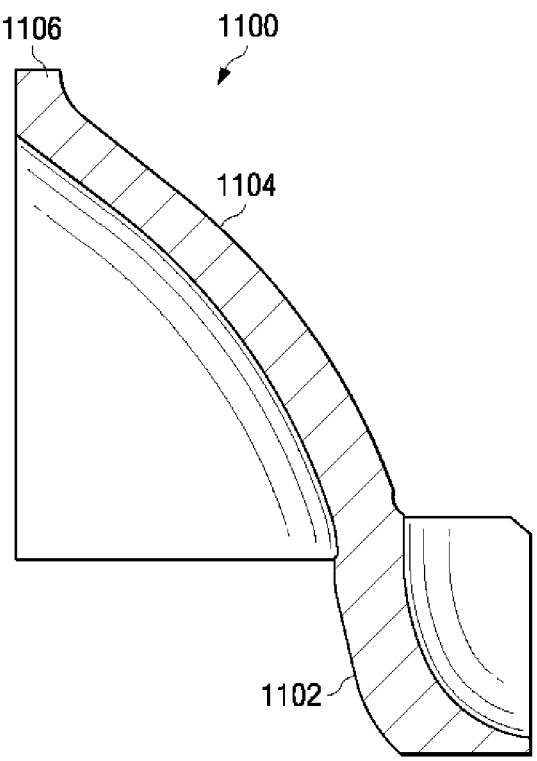
Figure 11C:
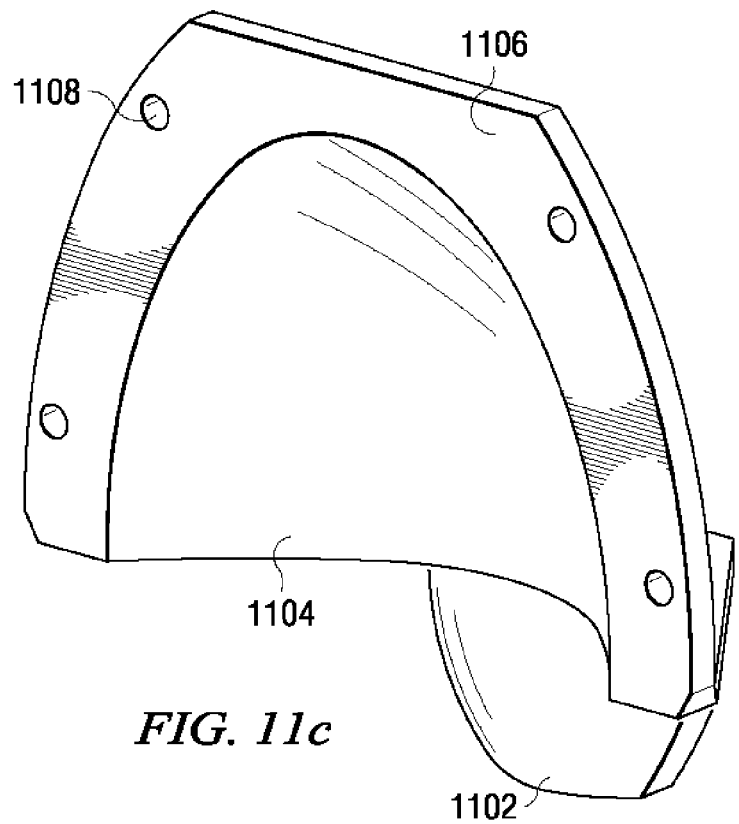
Figure 11D:
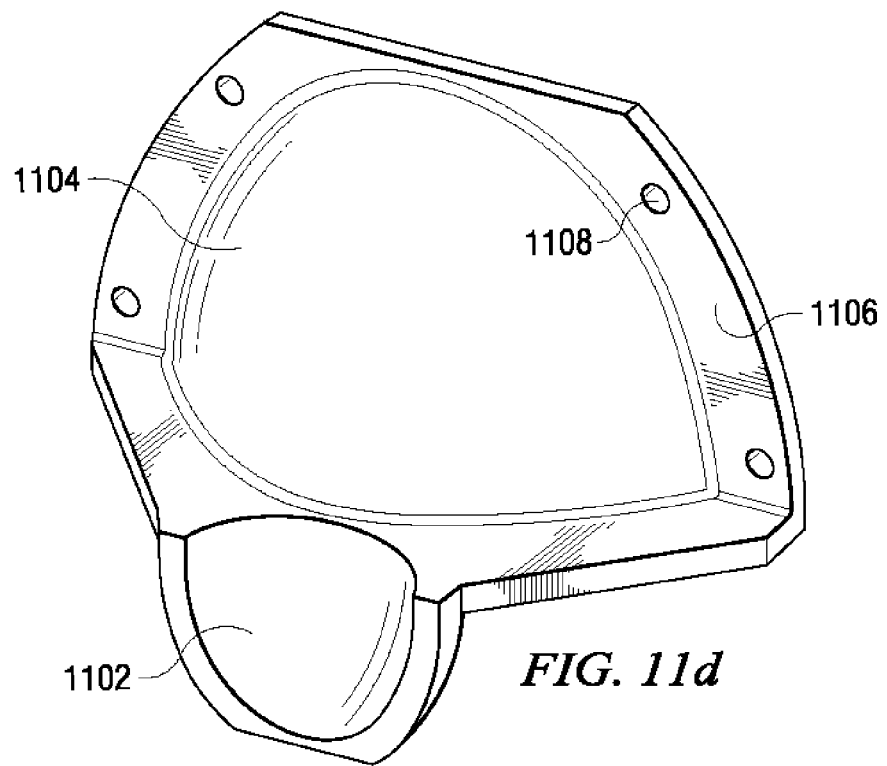

FIG. 11a is a bottom view of an integrated dual aspheric lens 1100 in which the aspheric lenses 42, 44 are integrated into a single unit, and FIG. 11b is a cross section view taken along the 11b-11b line of FIG. 11a. As illustrated in, for example, FIG. 6, the light projected through the first aspheric lens 42 is reflected back toward the general direction from which the light came by the bottom and top folding mirror panels 48a, 48b to the second aspheric lens 44. This arrangement allows the aspheric lenses 42, 44 to be vertically adjacent, which further enables the aspheric lenses 42, 44 to be integrated into the integrated dual aspheric lens 1100 as illustrated in FIGS. 11a and 11b.

The integrated dual aspheric lens 1100 includes a first aspheric lens portion 1102 corresponding to the aspheric lens 42 and a second aspheric lens portion 1104 corresponding to the aspheric lens 44. The integrated dual aspheric lens 1100 is preferably fabricated with the same type of material as the aspheric mirror 10 such that thermal dilation or water absorption of the aspheric mirror 10 will be compensated for by the integrated dual aspheric lens 1100. Accordingly, in an embodiment, the aspheric mirror 10 is formed of Zeonor and the integrated dual aspheric lens 1000 is formed of Zeonex. In other embodiments, the aspheric mirror 10 and the integrated dual aspheric lens 1100 are formed of polymethyl methacrylate (PMMA) to help further reduce costs. While Zeonor/Zeonex generally provides better thermal and water absorption qualities than PMMA, Zeoner/Zeonex lenses and mirrors are generally more expensive than PMMA lenses and mirrors. By utilizing PMMA for both the integrated dual aspheric lens 1100 and the aspheric mirror 10, costs may be reduced while maintaining good optical qualities. FIGS. 11b and 12c illustrate perspective views of the integrated dual aspheric lens 1100.

Also illustrated in FIGS. 11a-11d is an alignment flange 1106. The alignment flange 1106 may be formed as a part of the integrated dual aspheric lens 1100 such that the first aspheric lens portion 1102, the second aspheric lens portion 1104, and the alignment flange 1106 are formed of a single piece. In this manner, the alignment flange 1106 may assist with the alignment of the integrated dual aspheric lens 1100 within a display housing, thereby further reducing the possibility of alignment problems that may adversely affect image quality. In an embodiment, the alignment flange 1106 may include holes 1108 or other structures that may be used to also attach the integrated dual aspheric lens 1100 to the display housing.

As one of ordinary skill in the art will appreciate, integrating the aspheric lenses 42, 44 into the single integrated dual aspheric lens 1100 reduces problems of focus loss and increased distortion caused by optical misalignment problems associated with the assembly of multiple optical units. The use of a single unit may also increase the structural stability of the display system. Furthermore, costs may be reduced because only a single piece is fabricated (only requires a single set of molds) and assembled rather than two separate lenses. Therefore, the yield may be improved by decreased tolerance stackup, and throughput may be improved by reducing the number of parts.

Figure 12:
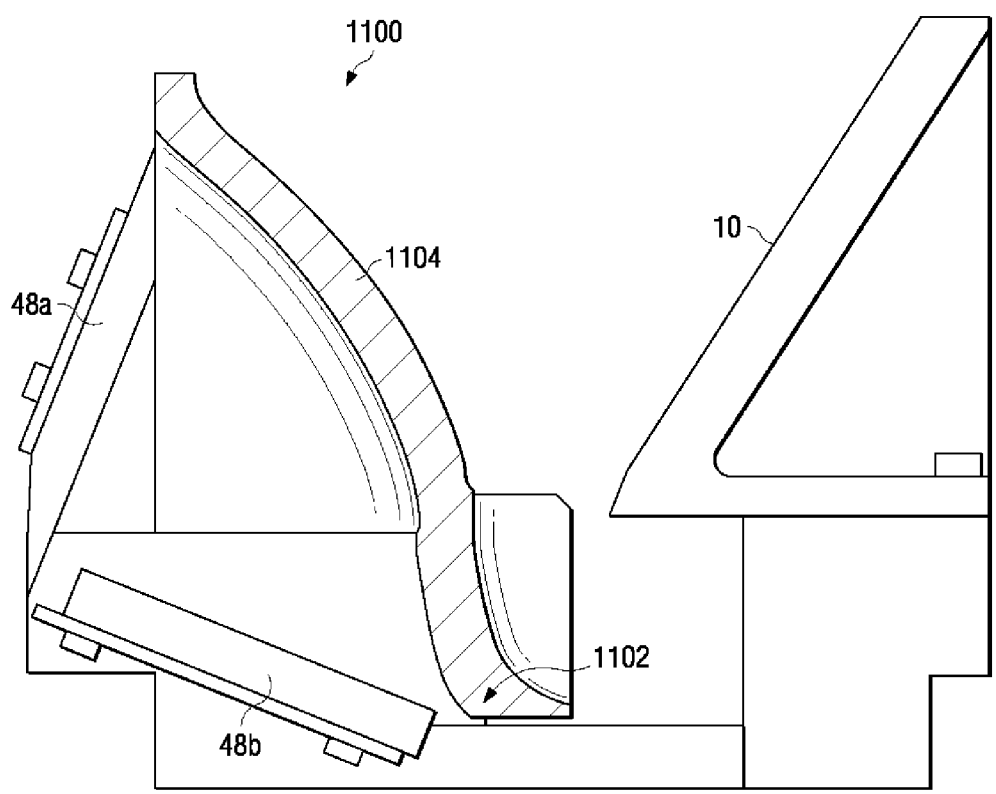
FIG. 12 is a cross section view of an integrated dual aspheric lens installed in a projection display system in accordance with an embodiment.

FIG. 12 illustrates portions of a cross section view of a projection display system such as that discussed above with the integrated dual aspheric lens 1100 installed therein in accordance with an embodiment. In this embodiment, light from a light source (not shown in FIG. 12) passes through the first aspheric lens 1102 to the bottom and top folding mirror panels 48b, 48a. It should be noted that the embodiment illustrated in FIG. 12 utilizes separate elements for the bottom and top folding mirror panels 48b, 48a for illustrative purposes only, and in another embodiment, the bottom and top folding mirror panels 48b, 48a may be a single piece as discussed above.

Light from the top folding mirror panel 48a is directed to the second aspheric lens portion 1104 and, subsequently, to the aspheric mirror 10. From the aspheric mirror 10, the light is directed to an optional folding mirror as discussed above and a display screen.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. Projection optics for a projection display system, the projection optics comprising:
   a first lens group positioned to receive light from a light source along an optical path;
   a plurality of aspheric lenses positioned to receive light from the light source along the optical path, at least two of the plurality of aspheric lenses being formed of a continuous piece of lens material; and
   one or more intermediate folding mirrors positioned along the optical path between the at least two of the aspheric lenses.

2. The projection optics of claim 1, further comprising an aspheric mirror in the optical path to reflect light from the plurality of aspheric lenses.

3. The projection optics of claim 1, wherein the lens material comprises Zeonex.

4. The projection optics of claim 1, wherein the lens material comprises PMMA.

5. The projection optics of claim 1, wherein the plurality of aspheric lenses comprises a first aspheric lens and a second aspheric lens vertically aligned.

6. The projection optics of claim 1, wherein the plurality of aspheric lenses includes an alignment flange, the alignment flange and the plurality of aspheric lenses being formed of a continuous piece of lens material.

7. The projection optics of claim 1, wherein the one or more intermediate folding mirrors include a first folding mirror and a second folding mirror, the second folding mirror being positioned adjacent to the first folding mirror along the optical path.

8. The projection optics of claim 7, wherein the first folding mirror and the second folding mirror are a single unit.

* * * * *